US006766292B1

(12) United States Patent
Chandran et al.

(10) Patent No.: US 6,766,292 B1
(45) Date of Patent: Jul. 20, 2004

(54) RELATIVE NOISE RATIO WEIGHTING TECHNIQUES FOR ADAPTIVE NOISE CANCELLATION

(75) Inventors: Ravi Chandran, South Bend, IN (US); Bruce E. Dunne, Niles, MI (US); Daniel J. Marchok, Buchanan, MI (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 09/535,844

(22) Filed: Mar. 28, 2000

(51) Int. Cl.[7] .......................... G10L 21/02; H04B 15/00
(52) U.S. Cl. ....................... 704/224; 704/226; 381/94.3
(58) Field of Search ................................ 704/205, 206, 704/210, 215, 225, 226, 224, 227, 200.1; 381/94.1, 94.2, 94.3, 94.7

(56) References Cited

U.S. PATENT DOCUMENTS 4,351,983 A 9/1982 Crouse et al.
4,628,529 A 12/1986 Borth et al.
4,630,305 A 12/1986 Borth et al.
4,658,426 A * 4/1987 Chabries et al. ......... 381/71.11
4,811,404 A 3/1989 Vilmur et al.
5,479,560 A * 12/1995 Mekata ....................... 704/209
5,617,508 A * 4/1997 Reaves ....................... 704/214
5,907,823 A * 5/1999 Sjoberg et al. ............. 704/225
5,943,429 A * 8/1999 Handel ...................... 381/94.2
6,108,610 A 8/2000 Winn
6,289,309 B1 * 9/2001 deVries ..................... 381/94.1
6,317,709 B1 * 11/2001 Zack ......................... 381/94.3
6,351,731 B1 * 2/2002 Anderson et al. ........... 704/225
6,477,489 B1 * 11/2002 Lockwood et al. ...... 704/200.1
6,523,003 B1 * 2/2003 Chandran et al. ........... 704/225
6,529,868 B1 * 3/2003 Chandran et al. ........... 704/226

OTHER PUBLICATIONS

IEEE Transactions on Acoustics, Speech and Signal Processing, vol. 28, No. 2, Apr. 1980, pp. 137–145, "Speech Enhancement Using a Soft–Decision Noise Suppression Filter," Robert J. McAulay and Marilyn L. Malpass.

IEEE Conference on Acoustics, Speech and Signal Processing, Apr. 1979, pp. 208–211, "Enhancement of Speech Corrupted by Acoustic Noise," M. Berouti, R. Schwartz and J. Makhoul.

Advanced Signal Processing and Digital Noise Reduction, 1996, Chapter 9, pp. 242–260, Saeed V. Vaseghi (ISBN Wiley 0471958751).

Proceedings of the IEEE, vol. 67, No. 12, Dec. 1979, pp. 1586–1604, "Enhancement and Bandwidth Compression of Noisy Speech," Jake S. Lim and Alan V. Oppenheim.

* cited by examiner

*Primary Examiner*—Richemond Dorvil
*Assistant Examiner*—Martin Lerner
(74) *Attorney, Agent, or Firm*—McAndrews, Held & Malloy, Ltd.

(57) ABSTRACT

In order to enhance the quality of a communication signal comprising speech signal components due to speech and noise signal components due to noise, a filter divides the communication signal into a plurality of frequency band signals representing the speech signal components and the noise signal components in a plurality of frequency bands. A calculator generates a plurality of weighting signals having weighting values corresponding to the frequency band signals. The weighting values represent at least approximations of the normalized powers of the noise signal components in the frequency band signals. The frequency band signals are altered in response to the weighting signals to generate weighted frequency band signals which are combined to generate a communication signal with enhanced quality.

44 Claims, 8 Drawing Sheets

RELATIVE NOISE RATIO WEIGHTING TECHNIQUES FOR ADAPTIVE NOISE CANCELLATION

BACKGROUND OF THE INVENTION

This invention relates to communication system noise cancellation techniques, and more particularly relates to weighting calculations used in such techniques.

The need for speech quality enhancement in single-channel speech communication systems has increased in importance especially due to the tremendous growth in cellular telephony. Cellular telephones are operated often in the presence of high levels of environmental background noise, such as in moving vehicles. Such high levels of noise cause significant degradation of the speech quality at the far end receiver. In such circumstances, speech enhancement techniques may be employed to improve the quality of the received speech so as to increase customer satisfaction and encourage longer talk times.

Most noise suppression systems utilize some variation of spectral subtraction. FIG. 1A shows an example of a typical prior noise suppression system that uses spectral subtraction. A spectral decomposition of the input noisy speech-containing signal is first performed using the Filter Bank. The Filter Bank may be a bank of bandpass filters (such as in reference [1], which is identified at the end of the description of the preferred embodiments). The Filter Bank decomposes the signal into separate frequency bands. For each band, power measurements are performed and continuously updated over time in the Noisy Signal Power & Noise Power Estimation block. These power measures are used to determine the signal-to-noise ratio (SNR) in each band. The Voice Activity Detector is used to distinguish periods of speech activity from periods of silence. The noise power in each band is updated primarily during silence while the noisy signal power is tracked at all times. For each frequency band, a gain (attenuation) factor is computed based on the SNR of the band and is used to attenuate the signal in the band. Thus, each frequency band of the noisy input speech signal is attenuated based on its SNR.

FIG. 1B illustrates another more sophisticated prior approach using an overall SNR level in addition to the individual SNR values to compute the gain factors for each band. (See also reference [2].) The overall SNR is estimated in the Overall SNR Estimation block. The gain factor computations for each band are performed in the Gain Computation block. The attenuation of the signals in different bands is accomplished by multiplying the signal in each band by the corresponding gain factor in the Gain Multiplication block. Low SNR bands are attenuated more than the high SNR bands. The amount of attenuation is also greater if the overall SNR is low. After the attenuation process, the signals in the different bands are recombined into a single, clean output signal. The resulting output signal will have an improved overall perceived quality.

The decomposition of the input noisy speech-containing signal can also be performed using Fourier transform techniques or wavelet transform techniques. FIG. 2 shows the use of discrete Fourier transform techniques (shown as the Windowing & FFT block). Here a block of input samples is transformed to the frequency domain. The magnitude of the complex frequency domain elements are attenuated based on the spectral subtraction principles described earlier. The phase of the complex frequency domain elements are left unchanged. The complex frequency domain elements are then transformed back to the time domain via an inverse discrete Fourier transform in the IFFT block, producing the output signal. Instead of Fourier transform techniques, wavelet transform techniques may be used for decomposing the input signal.

A Voice Activity Detector is part of many noise suppression systems. Generally, the power of the input signal is compared to a variable threshold level. Whenever the threshold is exceeded, speech is assumed to be present. Otherwise, the signal is assumed to contain only background noise. Such two-state voice activity detectors do not perform robustly under adverse conditions such as in cellular telephony environments. An example of a voice activity detector is described in reference [5].

Various implementations of noise suppression systems utilizing spectral subtraction differ mainly in the methods used for power estimation, gain factor determination, spectral decomposition of the input signal and voice activity detection. A broad overview of spectral subtraction techniques can be found in reference [3]. Several other approaches to speech enhancement, as well as spectral subtraction, are overviewed in reference [4].

Spectral weighting functions can improve the performance of some adaptive noise cancellation systems. In the past, deficiencies in such weighting functions have limited the effectiveness of known noise cancellation systems. For example, U.S. Pat. No. 4,630,305 (Borth et al., issued Dec. 16, 1986) describes an automatic gain selector for a noise suppression system based on an overall average background noise level of an input signal (See the Abstract.). This is a marked difference from the present invention which uses the normalized power of the noise signal component in one of the frequency bands into which the input signal is divided. This invention provides a solution not suggested by Borth et al.

BRIEF SUMMARY OF THE INVENTION

The preferred embodiment is useful in a communication system for processing a communication signal comprising a speech component due to speech and a noise component due to noise. In such an environment, the preferred embodiment enhances the quality of the communication signal by dividing the communication signal into a plurality of frequency band signals representing the speech signal components and the noise signal components in a plurality of frequency bands, preferably by using a filter or a calculator employing, for instance, a Fourier transform. A plurality of weighting signals having weighting values derived from the frequency band signals are generated. The weighting values correspond to at least approximations of the normalized powers of the noise signal components in the frequency band signals. The frequency band signals are altered in response to the weighting signals to generate weighted frequency band signals. The weighted frequency band signals are combined to generate a communication signal with enhanced quality.

The calculations and signal generation described above preferably can be accomplished with a calculator.

By using the foregoing techniques, the weighting function needed to improve communication signal quality can be generated with a degree of ease and accuracy unattained by the known prior techniques.

DESCRIPTION OF THE PREFERRED EMBODIMENTS

Figure 3:
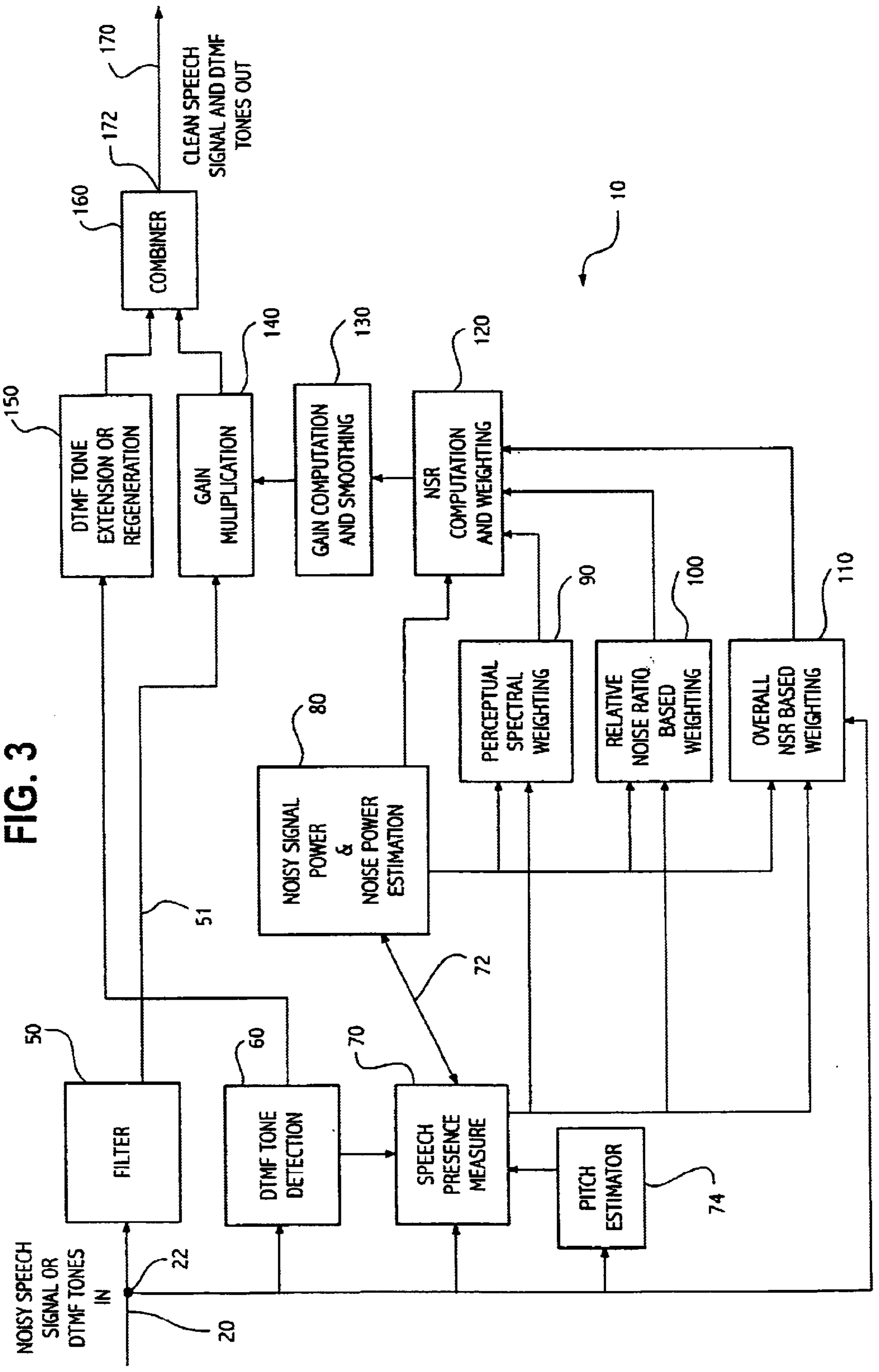
FIG. 3 is a functional and schematic block diagram illustrating a preferred form of adaptive noise cancellation system made in accordance with the invention.

The preferred form of ANC system shown in FIG. 3 is robust under adverse conditions often present in cellular telephony and packet voice networks. Such adverse conditions include signal dropouts and fast changing background noise conditions with wide dynamic ranges. The FIG. 3 embodiment focuses on attaining high perceptual quality in the processed speech signal under a wide variety of such channel impairments.

The performance limitation imposed by commonly used two-state voice activity detection functions is overcome in the preferred embodiment by using a probabilistic speech presence measure. This new measure of speech is called the Speech Presence Measure (SPM), and it provides multiple signal activity states and allows more accurate handling of the input signal during different states. The SPM is capable of detecting signal dropouts as well as new environments. Dropouts are temporary losses of the signal that occur commonly in cellular telephony and in voice over packet networks. New environment detection is the ability to detect the start of new calls as well as sudden changes in the background noise environment of an ongoing call. The SPM can be beneficial to any noise reduction function, including the preferred embodiment of this invention.

Accurate noisy signal and noise power measures, which are performed for each frequency band, improve the performance of the preferred embodiment. The measurement for each band is optimized based on its frequency and the state information from the SPM. The frequency dependence is due to the optimization of power measurement time constants based on the statistical distribution of power across the spectrum in typical speech and environmental background noise. Furthermore, this spectrally based optimization of the power measures has taken into consideration the non-linear nature of the human auditory system. The SPM state information provides additional information for the optimization of the time constants as well as ensuring stability and speed of the power measurements under adverse conditions. For instance, the indication of a new environment by the SPM allows the fast reaction of the power measures to the new environment.

According to the preferred embodiment, significant enhancements to perceived quality, especially under severe noise conditions, are achieved via three novel spectral weighting functions. The weighting functions are based on (1) the overall noise-to-signal ratio (NSR), (2) the relative noise ratio, and (3) a perceptual spectral weighting model. The first function is based on the fact that over-suppression under heavier overall noise conditions provide better perceived quality. The second function utilizes the noise contribution of a band relative to the overall noise to appropriately weight the band, hence providing a fine structure to the spectral weighting. The third weighting function is based on a model of the power-frequency relationship in typical environmental background noise. The power and frequency are approximately inversely related, from which the name of the model is derived. The inverse spectral weighting model parameters can be adapted to match the actual environment of an ongoing call. The weights are conveniently applied to the NSR values computed for each frequency band; although, such weighting could be applied to other parameters with appropriate modifications just as well. Furthermore, since the weighting functions are independent, only some or all the functions can be jointly utilized.

The preferred embodiment preserves the natural spectral shape of the speech signal which is important to perceived speech quality. This is attained by careful spectrally interdependent gain adjustment achieved through the attenuation factors. An additional advantage of such spectrally interdependent gain adjustment is the variance reduction of the attenuation factors.

Referring to FIG. 3, a preferred form of adaptive noise cancellation system 10 made in accordance with the invention comprises an input voice channel 20 transmitting a communication signal comprising a plurality of frequency bands derived from speech and noise to an input terminal 22. A speech signal component of the communication signal is due to speech and a noise signal component of the communication signal is due to noise.

A filter function 50 filters the communication signal into a plurality of frequency band signals on a signal path 51. A DTMF tone detection function 60 and a speech presence measure function 70 also receive the communication signal on input channel 20. The frequency band signals on path 51 are processed by a noisy signal power and noise power estimation function 80 to produce various forms of power signals.

The power signals provide inputs to an perceptual spectral weighting function 90, a relative noise ratio based weighting function 100 and an overall noise to signal ratio based weighting function 110. Functions 90, 100 and 110 also receive inputs from speech presence measure function 70 which is an improved voice activity detector. Functions 90, 100 and 110 generate preferred forms of weighting signals having weighting factors for each of the frequency bands generated by filter function 50. The weighting signals provide inputs to a noise to signal ratio computation and weighting function 120 which multiplies the weighting factors from functions 90, 100 and 110 for each frequency band together and computes an NSR value for each frequency band signal generated by the filter function 50. Some of the power signals calculated by function 80 also provide inputs to function 120 for calculating the NSR value.

Based on the combined weighting values and NSR value input from function 120, a gain computation and interdependent gain adjustment function 130 calculates preferred forms of initial gain signals and preferred forms of modified gain signals with initial and modified gain values for each of the frequency bands and modifies the initial gain values for each frequency band by, for example, smoothing so as to reduce the variance of the gain. The value of the modified gain signal for each frequency band generated by function 130 is multiplied by the value of every sample of the frequency band signal in a gain multiplication function 140 to generate preferred forms of weighted frequency band signals. The weighted frequency band signals are summed in a combiner function 160 to generate a communication signal which is transmitted through an output terminal 172 to a channel 170 with enhanced quality. A DTMF tone extension or regeneration function 150 also can place a DTMF tone on channel 170 through the operation of combiner function 160.

Figure 4:
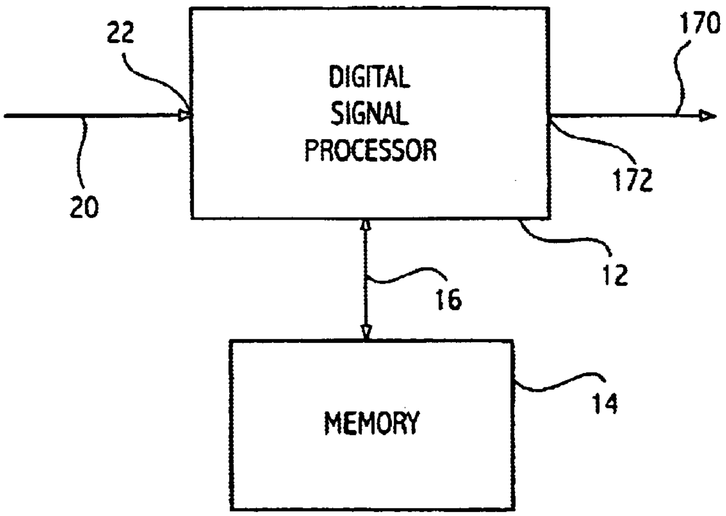
FIG. 4 is a schematic block diagram illustrating one embodiment of the invention implemented by a digital signal processor.

The function blocks shown in FIG. 3 may be implemented by a variety of well known calculators, including one or more digital signal processors (DSP) including a program memory storing programs which are executed to perform the functions associated with the blocks (described later in more detail) and a data memory for storing the variables and other data described in connection with the blocks. One such embodiment is shown in FIG. 4 which illustrates a calculator in the form of a digital signal processor 12 which communicates with a memory 14 over a bus 16. Processor 12 performs each of the functions identified in connection with the blocks of FIG. 3. Alternatively, any of the function blocks may be implemented by dedicated hardware implemented by application specific integrated circuits (ASICs), including memory, which are well known in the art. Of course, a combination of one or more DSPs and one or more ASICs also may be used to implement the preferred embodiment. Thus, FIG. 3 also illustrates an ANC 10 comprising a separate ASIC for each block capable of performing the function indicated by the block.

Filtering

In typical telephony applications, the noisy speech-containing input signal on channel 20 occupies a 4 kHz bandwidth. This communication signal may be spectrally decomposed by filter 50 using a filter bank or other means for dividing the communication signal into a plurality of frequency band signals. For example, the filter function could be implemented with block-processing methods, such as a Fast Fourier Transform (FFT). In the case of an FFT implementation of filter function 50, the resulting frequency band signals typically represent a magnitude value (or its square) and a phase value. The techniques disclosed in this specification typically are applied to the magnitude values of the frequency band signals. Filter 50 decomposes the input signal into N frequency band signals representing N frequency bands on path 51. The input to filter 50 will be denoted x(n) while the output of the $k^{th}$ filter in the filter 50 will be denoted $x_k(n)$, where n is the sample time.

The input, x(n), to filter 50 is high-pass filtered to remove DC components by conventional means not shown.

Gain Computation

We first will discuss one form of gain computation. Later, we will discuss an interdependent gain adjustment technique. The gain (or attenuation) factor for the $k^{th}$ frequency band is computed by function 130 once every T samples as $$G_k(n) = \begin{cases} 1 - W_k(n)NSR_k(n), & n = 0, T, 2T, \ldots \\ G_k(n-1), & n = 1, 2, \ldots, T-1, T+1, \ldots, 2T-1, \ldots \end{cases} \quad (1)$$

A suitable value for T is 10 when the sampling rate is 8 kHz. The gain factor will range between a small positive value, $\epsilon$, and 1 because the weighted NSR values are limited to lie in the range $[0,1-\epsilon]$. Setting the lower limit of the gain to $\epsilon$ reduces the effects of "musical noise" (described in reference [2]) and permits limited background signal transparency. In the preferred embodiment, $\epsilon$ is set to 0.05. The weighting factor, $W_k(n)$, is used for over-suppression and under-suppression purposes of the signal in the $k^{th}$ frequency band. The overall weighting factor is computed by function 120 as $$W_k(n)=u_k(n)v_k(n)w_k(n) \quad (2)$$

where $u_k(n)$ is the weight factor or value based on overall NSR as calculated by function 110, $w_k(n)$ is the weight factor or value based on the relative noise ratio weighting as calculated by function 100, and $v_k(n)$ is the weight factor or value based on perceptual spectral weighting as calculated by function 90. As previously described, each of the weight factors may be used separately or in various combinations.

Gain Multiplication

The attenuation of the signal $x_k(n)$ from the $k^{th}$ frequency band is achieved by function 140 by multiplying $x_k(n)$ by its corresponding gain factor, $G_k(n)$, every sample to generate weighted frequency band signals. Combiner 160 sums the resulting attenuated signals, y(n), to generate the enhanced output signal on channel 170. This can be expressed mathematically as:

$$y(n) = \sum_k G_k(n)x_k(n) \quad (3)$$

Power Estimation

The operations of noisy signal power and noise power estimation function 80 include the calculation of power estimates and generating preferred forms of corresponding power band signals having power band values as identified in Table 1 below. The power, P(n) at sample n, of a discrete-time signal u(n), is estimated approximately by either (a) lowpass filtering the full-wave rectified signal or (b) lowpass filtering an even power of the signal such as the square of the signal. A first order IIR filter can be used for the lowpass filter for both cases as follows:

$$P(n)=\beta P(n-1)+\alpha|u(n)| \quad (4a)$$

$$P(n)=\beta P(n-1)+\alpha[u(n)]^2 \quad (4b)$$

The lowpass filtering of the full-wave rectified signal or an even power of a signal is an averaging process. The power estimation (e.g., averaging) has an effective time window or time period during which the filter coefficients are large, whereas outside this window, the coefficients are close to zero. The coefficients of the lowpass filter determine the size of this window or time period. Thus, the power estimation (e.g., averaging) over different effective window sizes or time periods can be achieved by using different filter coefficients. When the rate of averaging is said to be increased, it is meant that a shorter time period is used. By using a shorter time period, the power estimates react more quickly to the newer samples, and "forget" the effect of older samples more readily. When the rate of averaging is said to be reduced, it is meant that a longer time period is used. The first order IIR filter has the following transfer function:

$$H(z)=\frac{\alpha}{1-\beta z^{-1}} \tag{5}$$

The DC gain of this filter is $$H(1)=\frac{\alpha}{1-\beta}.$$

The coefficient, β, is a decay constant. The decay constant represents how long it would take for the present (non-zero) value of the power to decay to a small fraction of the present value if the input is zero, i.e. u(n)=0. If the decay constant, β, is close to unity, then it will take a longer time for the power value to decay. If β is close to zero, then it will take a shorter time for the power value to decay. Thus, the decay constant also represents how fast the old power value is forgotten and how quickly the power of the newer input samples is incorporated. Thus, larger values of β result in longer effective averaging windows or time periods.

Depending on the signal of interest, effectively averaging over a shorter or longer time period may be appropriate for power estimation. Speech power, which has a rapidly changing profile, would be suitably estimated using a smaller β. Noise can be considered stationary for longer periods of time than speech. Noise power would be more accurately estimated by using a longer averaging window (large β).

The preferred form of power estimation significantly reduces computational complexity by undersampling the input signal for power estimation purposes. This means that only one sample out of every T samples is used for updating the power P(n) in (4). Between these updates, the power estimate is held constant. This procedure can be mathematically expressed as $$P(n)=\begin{cases}\beta P(n-1)+\alpha|u(n)|, & n=0, 2T, 3T, \dots\\ P(n-1), & n=1, 2, \dots T-1, T+1, \dots 2T-1, \dots\end{cases} \tag{6}$$

Such first order lowpass IIR filters may be used for estimation of the various power measures listed in the Table 1 below:

TABLE 1

| Variable | Description |
|---|---|
| $P_{SIG}$ (n) | Overall noisy signal power |
| $P_{BN}$ (n) | Overall background noise power |
| $P_S{}^k$ (n) | Noisy signal power in the kth frequency band. |
| $P_N{}^k$ (n) | Noise power in the kth freqnency band. |
| $P_{1st,ST}$ (n) | Short term overall noisy signal power in the first formant |
| $P_{1st,LT}$ (n) | Long-term overall noisy signal power in the first formant |

Function 80 generates a signal for each of the foregoing Variables. Each of the signals in Table 1 is calculated using the estimations described in this Power Estimation section. The Speech Presence Measure, which will be discussed later, utilizes short-term and long-term power measures in the first formant region. To perform the first formant power measurements, the input signal, x(n), is lowpass filtered using an IIR filter $$H(z)=\frac{b_0+b_1z^{-1}+b_0z^{-2}}{1+a_1z^{-1}+a_2z^{-2}}.$$

In the preferred implementation, the filter has a cut-off frequency at 850 Hz and has coefficients $b_0$=0.1027, $b_1$=0.2053, $a_1$=−0.9754 and $-a_2$=0.4103. Denoting the output of this filter as $x_{low}(n)$, the short-term and long-term first formant power measures can be obtained as follows:

$$P_{1st,ST}(n)=\beta_{1st,ST}P_{1st,ST}(n-1)+\alpha_{1st,ST}|x_{low}(n)| \tag{7}$$

$$\begin{aligned}P_{1st,LT}(n) &= \beta_{1st,LT,1}P_{1st,LT}(n-1)+\alpha_{1st,LT,1}|x_{low}| && \text{if } P_{1st,LT}(n)<P_{1st,ST} \text{ and DROPOUT}=0\\ &= \beta_{1st,LT,2}P_{1st,LT}(n-1)+\alpha_{1st,LT,2}|x_{low}(n)| && \text{if } P_{1st,LT}(n)\geq P_{1st,ST}(n) \text{ and DROPOUT}=0\\ &= P_{1st,LT}(n-1) \text{ if DROPOUT}=1\end{aligned} \tag{8}$$

DROPOUT in (8) will be explained later. The time constants used in the above difference equations are the same as those described in (6) and are tabulated below:

| Time Constant | Value |
|---|---|
| $\alpha_{1st,LT,1}$ | 1/16000 |
| $\beta_{1st,LT,1}$ | 15999/16000 |
| $\alpha_{1st,LT,2}$ | 1/256 |
| $\beta_{1st,LT,2}$ | 255/256 |
| $\alpha_{1st,ST}$ | 1/128 |
| $\beta_{1st,ST}$ | 127/128 |

One effect of these time constants is that the short term first formant power measure is effectively averaged over a shorter time period than the long term first formant power measure. These time constants are examples of the parameters used to analyze a communication signal and enhance its quality.

Noise-to-Signal Ratio (NSR) Estimation

Regarding overall NSR based weighting function 110, the overall NSR, $NSR_{overall}(n)$ at sample n, is defined as $$NSR_{overall}(n)=\frac{P_{BN}(n)}{P_{SIG}(n)} \tag{9}$$

The overall NSR is used to influence the amount of over-suppression of the signal in each frequency band and will be discussed later. The NSR for the $k^{th}$ frequency band may be computed as $$NSR_k(n)=\frac{P_N^k(n)}{P_S^k(n)} \tag{10}$$

Those skilled in the art recognize that other algorithms may be used to compute the NSR values instead of expression (10).

Speech Presence Measure (SPM)

Speech presence measure (SPM) 70 may utilize any known DTMF detection method if DTMF tone extension or regeneration functions 150 are to be performed. In the preferred embodiment, the DTMF flag will be 1 when DTMF activity is detected and 0 otherwise. If DTMF tone extension or regeneration is unnecessary, then the following can be understood by always assuming that DTMF=0.

SPM 70 primarily performs a measure of the likelihood that the signal activity is due to the presence of speech. This can be quantized to a discrete number of decision levels depending on the application. In the preferred embodiment, we use five levels. The SPM performs its decision based on the DTMF flag and the LEVEL value. The DTMF flag has been described previously. The LEVEL value will be described shortly. The decisions, as quantized, are tabulated below. The lower four decisions (Silence to High Speech) will be referred to as SPM decisions.

TABLE 1

Joint Speech Presence Measure and DTMF Activity decisions

| DTMF | LEVEL | Decision |
|---|---|---|
| 1 | X | DTMF Activity Present |
| 0 | 0 | Silence Probability |
| 0 | 1 | Low Speech Probability |
| 0 | 2 | Medium Speech Probability |
| 0 | 3 | High Speech Probability |

In addition to the above multi-level decisions, the SPM also outputs two flags or signals, DROPOUT and NEWENV, which will be described in the following sections.

Power Measurement in the SPM

The novel multi-level decisions made by the SPM are achieved by using a speech likelihood related comparison signal and multiple variable thresholds. In our preferred embodiment, we derive such a speech likelihood related comparison signal by comparing the values of the first formant short-term noisy signal power estimate, $P_{1st,ST}(n)$, and the first formant long-term noisy signal power estimate, $P_{1st,LT}(n)$. Multiple comparisons are performed using expressions involving $P_{1st,ST}(n)$ and $P_{1st,LT}(n)$ as given in the preferred embodiment of equation (11) below. The result of these comparisons is used to update the speech likelihood related comparison signal. In our preferred embodiment, the speech likelihood related comparison signal is a hangover counter, $h_{var}$. Each of the inequalities involving $P_{1st,ST}(n)$ and $P_{1st,LT}(n)$ uses different scaling values (i.e. the $\mu_i$'s). They also possibly may use different additive constants, although we use $P_0=2$ for all of them.

The hangover counter, $h_{var}$, can be assigned a variable hangover period that is updated every sample based on multiple threshold levels, which, in the preferred embodiment, have been limited to 3 levels as follows:

$$\begin{aligned} h_{var} &= h_{max,3} && \text{if } P_{1st,ST}(n) > \mu_3 P_{1st,LT}(n) + P_0 \quad (11) \\ &= \max[h_{max,2}, h_{var}-1] && \text{if } P_{1st,ST}(n) > \mu_2 P_{1st,LT}(n) + P_0 \\ &= \max[h_{max,1}, h_{var}-1] && \text{if } P_{1st,ST}(n) > \mu_1 P_{1st,LT}(n) + P_0 \\ &= \max[0, h_{var}-1] && \text{otherwise} \end{aligned}$$

where $h_{max,3}>h_{max,2}>h_{max,1}$ and $\mu_3>\mu_2>\mu_1$.

Suitable values for the maximum values of $h_{var}$ are $h_{max,3}=2000$, $h_{max,2}=1400$ and $h_{max,1}=800$. Suitable scaling values for the threshold comparison factors are $\mu_3=3.0$, $\mu_2=2.0$ and $\mu_1=1.6$. The choice of these scaling values are based on the desire to provide longer hangover periods following higher power speech segments. Thus, the inequalities of (11) determine whether $P_{1st,ST}(n)$ exceeds $P_{1st,LT}(n)$ by more than a predetermined factor. Therefore, $h_{var}$ represents a preferred form of comparison signal resulting from the comparisons defined in (11) and having a value representing differing degrees of likelihood that a portion of the input communication signal results from at least some speech.

Since longer hangover periods are assigned for higher power signal segments, the hangover period length can be considered as a measure that is directly proportional to the probability of speech presence. Since the SPM decision is required to reflect the likelihood that the signal activity is due to the presence of speech, and the SPM decision is based partly on the LEVEL value according to Table 1, we determine the value for LEVEL based on the hangover counter as tabulated below.

| Condition | Decision |
|---|---|
| $h_{var} > h_{max,2}$ | LEVEL = 3 |
| $h_{max,2} \geqq h_{var} > h_{max,1}$ | LEVEL = 2 |
| $h_{max,1} \geqq h_{var} > 0$ | LEVEL = 1 |
| $h_{var} = 0$ | LEVEL = 0 |

SPM 70 generates a preferred form of a speech likelihood signal having values corresponding to LEVELs 0–3. Thus, LEVEL depends indirectly on the power measures and represents varying likelihood that the input communication signal results from at least some speech. Basing LEVEL on the hangover counter is advantageous because a certain amount of hysterisis is provided. That is, once the count enters one of the ranges defined in the preceding table, the count is constrained to stay in the range for variable periods of time. This hysterisis prevents the LEVEL value and hence the SPM decision from changing too often due to momentary changes in the signal power. If LEVEL were based solely on the power measures, the SPM decision would tend to flutter between adjacent levels when the power measures lie near decision boundaries.

Dropout Detection in the SPM

Another novel feature of the SPM is the ability to detect 'dropouts' in the signal. A dropout is a situation where the input signal power has a defined attribute, such as suddenly dropping to a very low level or even zero for short durations of time (usually less than a second). Such dropouts are often experienced especially in a cellular telephony environment. For example, dropouts can occur due to loss of speech frames in cellular telephony or due to the user moving from a noisy environment to a quiet environment suddenly. During dropouts, the ANC system operates differently as will be explained later.

Dropout detection is incorporated into the SPM. Equation (8) shows the use of a DROPOUT signal in the long-term (noise) power measure. During dropouts, the adaptation of the long-term power for the SPM is stopped or slowed significantly. This prevents the long-term power measure from being reduced drastically during dropouts, which could potentially lead to incorrect speech presence measures later.

The SPM dropout detection utilizes the DROPOUT signal or flag and a counter, $c_{dropout}$. The counter is updated as follows every sample time.

| Condition | Decision/Action |
|---|---|
| $P_{1st,ST}(n) \geqq \mu_{dropout} P_{1ST,LT}(n)$ or $c_{dropout} = c_2$ | $c_{dropout} = 0$ |
| $P_{1st,ST}(n) < \mu_{dropout} P_{1ST,LT}(n)$ and $0 \leqq c_{dropout} < c_2$ | Increment $c_{dropout}$ |

The following table shows how DROPOUT should be updated.

| Condition | Decision/Action |
|---|---|
| $0 < c_{dropout} < c_1$ | DROPOUT = 1 |
| Otherwise | DROPOUT = 0 |

As shown in the foregoing table, the attribute of $c_{dropout}$ determines at least in part the condition of the DROPOUT signal. A suitable value for the power threshold comparison factor, $\mu_{dropout}$, is 0.2. Suitable values for $c_1$ and $c_2$ are $c_1=4000$ and $c_2=8000$, which correspond to 0.5 and 1 second, respectively. The logic presented here prevents the SPM from indicating the dropout condition for more than $c_1$ samples.

Limiting of Long-term (Noise) Power Measure in the SPM

In addition to the above enhancements to the long-term (noise) power measure, $P_{1st,LT}(n)$, it is further constrained from exceeding a certain threshold, $P_{1st,LT,max}$, i.e. if the value of $P_{1st,LT}(n)$ computed according to equation (7) is greater than $P_{1st,LT,max}$, then we set $P_{1st,LT}(n)=P_{1st,LT,max}$. This enhancement to the long-term power measure makes the SPM more robust as it will not be able to rise to the level of the short-term power measure in the case of a long and continuous period of loud speech. This prevents the SPM from providing an incorrect speech presence measure in such situations. A suitable value for $P_{1st,LT,max}$=500/8159 assuming that the maximum absolute value of the input signal x(n) is normalized to unity.

New Environment Detection in the SPM

At the beginning of a call, the background noise environment would not be known by ANC system 10. The background noise environment can also change suddenly when the user moves from a noisy environment to a quieter environment e.g. moving from a busy street to an indoor environment with windows and doors closed. In both these cases, it would be advantageous to adapt the noise power measures quickly for a short period of time. In order to indicate such changes in the environment, the SPM outputs a signal or flag called NEWENV to the ANC system.

The detection of a new environment at the beginning of a call will depend on the system under question. Usually, there is some form of indication that a new call has been initiated. For instance, when there is no call on a particular line in some networks, an idle code may be transmitted. In such systems, a new call can be detected by checking for the absence of idle codes. Thus, the method for inferring that a new call has begun will depend on the particular system.

In the preferred embodiment of the SPM, we use the flag NEWENV together with a counter $c_{newenv}$ and a flag, OLDDROPOUT. The OLDDROPOUT flag contains the value of the DROPOUT from the previous sample time.

A pitch estimator is used to monitor whether voiced speech is present in the input signal. If voiced speech is present, the pitch period (i.e., the inverse of pitch frequency) would be relatively steady over a period of about 20 ms. If only background noise is present, then the pitch period would change in a random manner. If a cellular handset is moved from a quiet room to a noisy outdoor environment, the input signal would be suddenly much louder and may be incorrectly detected as speech. The pitch detector can be used to avoid such incorrect detection and to set the new environment signal so that the new noise environment can be quickly measured.

To implement this function, any of the numerous known pitch period estimation devices may be used, such as device 74 shown in FIG. 3. In our preferred implementation, the following method is used. Denoting K(n−T) as the pitch period estimate from T samples ago, and K(n) as the current pitch period estimate, if $|K(n)-K(n-40)|>3$, and $|K(n-40)-K(n-80)|>3$, and $|K(n-80)-K(n-120)|>3$, then the pitch period is not steady and it is unlikely that the input signal contains voiced speech. If these conditions are true and yet the SPM says that LEVEL>1 which normally implies that significant speech is present, then it can be inferred that a sudden increase in the background noise has occurred.

The following table specifies a method of updating NEWENV and $c_{newenv}$.

| Condition | Decision/Action |
|---|---|
| Beginning of a new call or ((OLDDROPOUT = 1) and (DROPOUT = 0)) or (\|K(n)-K(n-40)\|>3 and \|K(n-40)-K(n-80)\|>3 and \|K(n-80)-K(n-120)\|>3 and LEVEL>1) | NEWENV = 1<br>$c_{newenv} = 0$ |
| Not the beginning of a new call or OLDDROPOUT = 0 or DROPOUT = 1 | No action |
| $c_{newenv} < c_{newenv,max}$ and NEWENV = 1 | Increment $c_{newenv}$ |
| $c_{newenv} = c_{newenv,max}$ | NEWENV = 0<br>$c_{newenc} = 0$ |

In the above method, the NEWENV flag is set to 1 for a period of time specified by $c_{newenv,max}$, after which it is cleared. The NEWENV flag is set to 1 in response to various events or attributes:

(1) at the beginning of a new call;

(2) at the end of a dropout period;

(3) in response to an increase in background noise (for example, the pitch detector 74 may reveal that a new high amplitude signal is not due to speech, but rather due to noise.); or (4) in response to a sudden decrease in background noise to a lower level of sufficient amplitude to avoid being a drop out condition.

A suitable value for the $c_{newenv,max}$ is 2000 which corresponds to 0.25 seconds.

Operation of the ANC System

Referring to FIG. 3, the multi-level SPM decision and the flags DROPOUT and NEWENV are generated on path 72 by SPM 70. With these signals, the ANC system is able to perform noise cancellation more effectively under adverse conditions. Furthermore, as previously described, the power measurement function has been significantly enhanced compared to prior known systems. Additionally, the three independent weighting functions carried out by functions 90, 100 and 110 can be used to achieve over-suppression or under-suppression. Finally, gain computation and interdependent gain adjustment function 130 offers enhanced performance.

Use of Dropout Signals

When the flag DROPOUT=1, the SPM 70 is indicating that there is a temporary loss of signal. Under such conditions, continuing the adaptation of the signal and noise power measures could result in poor behavior of a noise suppression system. One solution is to slow down the power measurements by using very long time constants. In the preferred embodiment, we freeze the adaptation of both signal and noise power measures for the individual frequency bands, i.e. we set $P_N^k(n)=P_N^k(n-1)$ and $P_S^k(n)=P_S^k(n-1)$ when DROPOUT=1. Since DROPOUT remains at 1 only for a short time (at most 0.5 sec in our implementation), an erroneous dropout detection may only affect ANC system 10 momentarily. The improvement in speech quality gained by our robust dropout detection outweighs the low risk of incorrect detection.

Use of New Environment Signals

When the flag NEWENV=1, SPM 70 is indicating that there is a new environment due to either a new call or that it is a post-dropout environment. If there is no speech activity, i.e. the SPM indicates that there is silence, then it would be advantageous for the ANC system to measure the noise spectrum quickly. This quick reaction allows a shorter adaptation time for the ANC system to a new noise environment. Under normal operation, the time constants, $\alpha_N^k$ and $\beta_N^k$, used for the noise power measurements would be as given in Table 2 below. When NEWENV=1, we force the time constants to correspond to those specified for the Silence state in Table 2. The larger $\beta$ values result in a fast adaptation to the background noise power. SPM 70 will only hold the NEWENV at 1 for a short period of time. Thus, the ANC system will automatically revert to using the normal Table 2 values after this time.

TABLE 2

Power measurement time constants

| SPM | | Time Constants | | | |
| --- | --- | --- | --- | --- | --- |
| Decision | Frequency Range | $\alpha_N^k$ | $\beta_N^k$ | $\alpha_S^k$ | $\beta_S^k$ |
| Silence Probability LEVEL = 0 | <800 Hz or >2500 Hz | T/60 | 1-T/6000 | 0.533 | 1-T/240 |
| | 800 Hz to 2500 Hz | T/80 | 1-T/8000 | 0.533 | 1-T/240 |
| Low Speech Probability LEVEL = 1 | <800 Hz or >2500 Hz | T/120 | 1-T/12000 | 0.533 | 1-T/240 |
| | 800 Hz to 2500 Hz | T/160 | 1-T/16000 | 0.64 | 1-T/200 |
| Medium Speech Probability LEVEL = 2 | <800 Hz or >2500 Hz | Noise power values remain substantially constant. | | 0.64 | 1-T/200 |
| | 800 Hz to 2500 Hz | | | 0.853 | 1-T/150 |
| High Speech Probability LEVEL = 3 | <800 Hz or >2500 Hz | | | 0.853 | 1-T/150 |
| | 800 Hz to 2500 Hz | | | 1 | 1-T/128 |

Frequency-Dependent and Speech Presence Measure-Based Time Constants for Power Measurement The noise and signal power measurements for the different frequency bands are given by $$P_N^k(n) = \begin{cases} \beta_N^k P_N^k(n-1) + \alpha_N^k |x_k(n)|, & n = 0, 2T, 3T, \ldots \\ P_N^k(n-1), & n = 1, 2, \ldots T-1, T+1, \ldots 2T-1, \ldots \end{cases} \quad (12)$$

$$P_S^k(n) = \begin{cases} \beta_S^k P_S^k(n-1) + \alpha_S^k |x_k(n)|, & n = 0, 2T, 3T, \ldots \\ P_S^k(n-1), & n = 1, 2, \ldots T-1, T+1, \ldots 2T-1, \ldots \end{cases} \quad (13)$$

In the preferred embodiment, the time constants $\beta_N^k$, $\beta_S^k$, $\alpha_N^k$ and $\alpha_S^k$ are based on both the frequency band and the SPM decisions. The frequency dependence will be explained first, followed by the dependence on the SPM decisions.

The use of different time constants for power measurements in different frequency bands offers advantages. The power in frequency bands in the middle of the 4 kHz speech bandwidth naturally tend to have higher average power levels and variance during speech than other bands. To track the faster variations, it is useful to have relatively faster time constants for the signal power measures in this region. Relatively slower signal power time constants are suitable for the low and high frequency regions. The reverse is true for the noise power time constants, i.e. faster time constants in the low and high frequencies and slower time constants in the middle frequencies. We have discovered that it would be better to track at a higher speed the noise in regions where speech power is usually low. This results in an earlier suppression of noise especially at the end of speech bursts.

In addition to the variation of time constants with frequency, the time constants are also based on the multi-level decisions of the SPM. In our preferred implementation of the SPM, there are four possible SPM decisions (i.e., Silence, Low Speech, Medium Speech, High Speech). When the SPM decision is Silence, it would be beneficial to speed up the tracking of the noise in all the bands. When the SPM decision is Low Speech, the likelihood of speech is higher and the noise power measurements are slowed down accordingly. The likelihood of speech is considered too high in the remaining speech states and thus the noise power measurements are turned off in these states. In contrast to the noise power measurement, the time constants for the signal power measurements are modified so as to slow down the tracking when the likelihood of speech is low. This reduces the variance of the signal power measures during low speech levels and silent periods. This is especially beneficial during silent periods as it prevents short-duration noise spikes from causing the gain factors to rise.

In the preferred embodiment, we have selected the time constants as shown in Table 2 above. The DC gains of the IIR filters used for power measurements remain fixed across all frequencies for simplicity in our preferred embodiment although this could be varied as well.

Weighting Based on Overall NSR

In reference [2], it is explained that the perceived quality of speech is improved by over-suppression of frequency bands based on the overall SNR. In the preferred embodiment, over-suppression is achieved by weighting the NSR according to (2) using the weight, $u_k(n)$, given by $$u_k(n) = 0.5 + NSR_{overall}(n) \quad (14)$$

Here, we have limited the weight to range from 0.5 to 1.5. This weight computation may be performed slower than the sampling rate for economical reasons. A suitable update rate is once per 2T samples.

Weighting Based on Relative Noise Ratios

We have discovered that improved noise cancellation results from weighting based on relative noise ratios. According to the preferred embodiment, the weighting, denoted by $w_k$, based on the values of noise power signals in each frequency band, has a nominal value of unity for all frequency bands. This weight will be higher for a frequency band that contributes relatively more to the total noise than other bands. Thus, greater suppression is achieved in bands that have relatively more noise. For bands that contribute little to the overall noise, the weight is reduced below unity to reduce the amount of suppression. This is especially important when both the speech and noise power in a band are very low and of the same order. In the past, in such situations, power has been severely suppressed, which has resulted in hollow sounding speech. However, with this weighting function, the amount of suppression is reduced, preserving the richness of the signal, especially in the high frequency region.

There are many ways to determine suitable values for $w_k$. First, we note that the average background noise power is the sum of the background noise powers in N frequency bands divided by the N frequency bands and is represented by $P_{BN}(n)|N$.

The relative noise ratio in a frequency band can be defined as $$R_k(n) = \frac{P_N^k(n)}{P_{BN}(n)/N} \quad (15)$$

Figure 5:
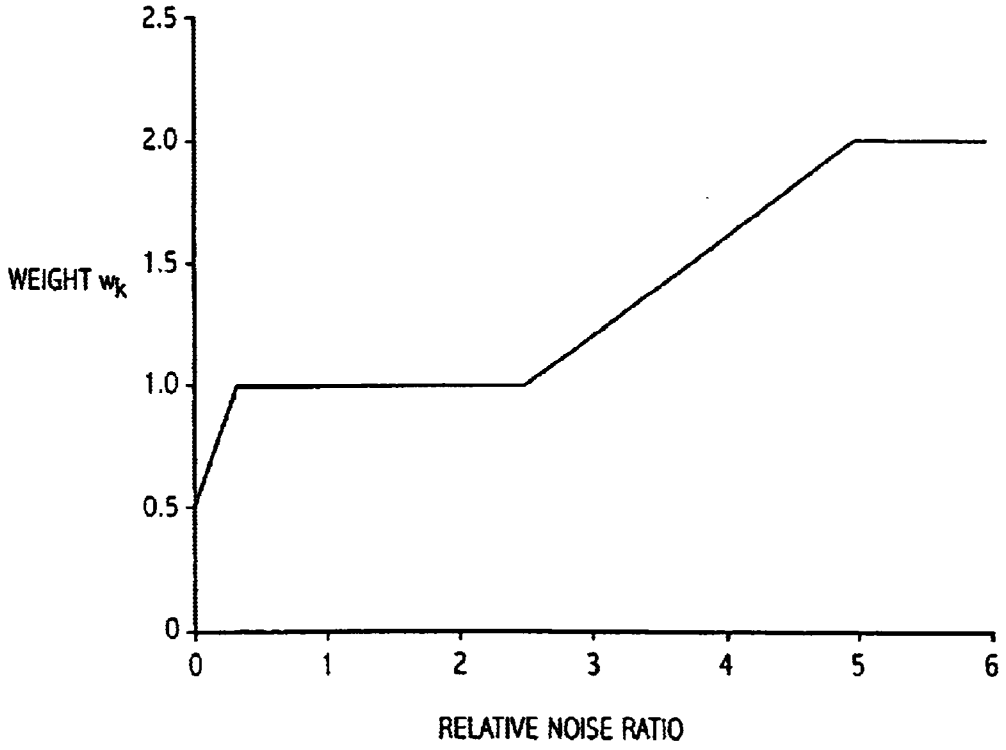
FIG. 5 is graph of relative noise ratio versus weight illustrating a preferred assignment of weight for various ranges of values of relative noise ratios.

The goal is to assign a higher weight for a band when the ratio, $R_k(n)$, for that band is high, and lower weights when the ratio is low. In the preferred embodiment, we assign these weights as shown in FIG. 5, where the weights are allowed to range between 0.5 and 2. To save on computational time and cost, we perform the update of (15) once per 2T samples. Function 80 (FIG. 3) generates preferred forms of band power signals corresponding to the terms on the right side of equation (15) and function 100 generates preferred forms of weighting signals with weighting values corresponding to the term on the left side of equation (15).

Figure 6:
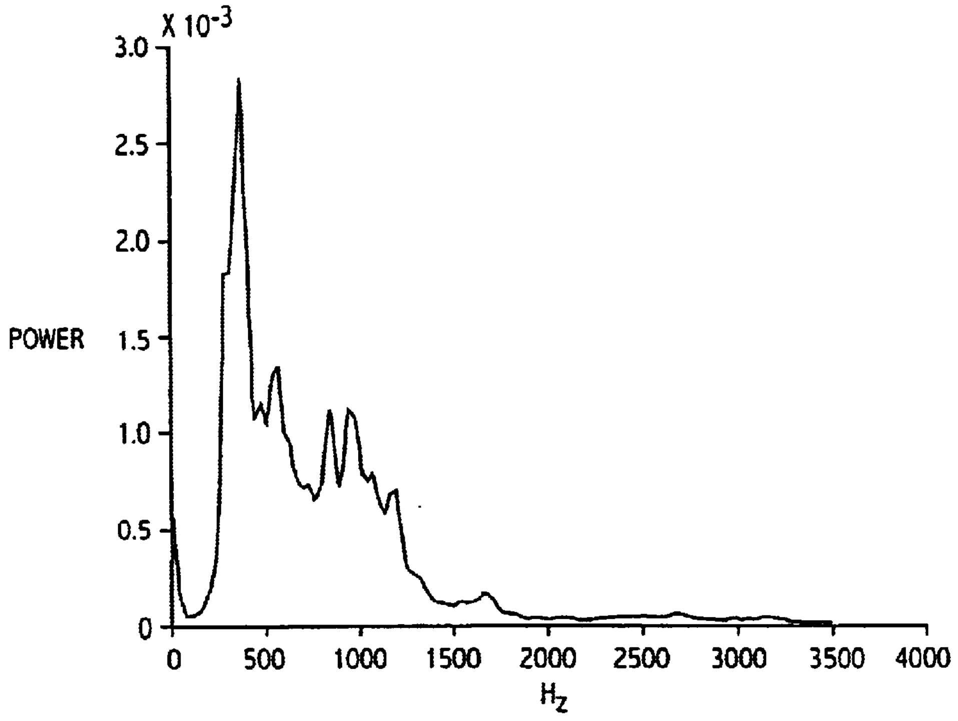
FIG. 6 is a graph plotting power versus Hz illustrating a typical power spectral density of background noise recorded from a cellular telephone in a moving vehicle.

If an approximate knowledge of the nature of the environmental noise is known, then the RNR weighting technique can be extended to incorporate this knowledge. FIG. 6 shows the typical power spectral density of background noise recorded from a cellular telephone in a moving vehicle. Typical environmental background noise has a power spectrum that corresponds to pink or brown noise. (Pink noise has power inversely proportional to the frequency. Brown noise has power inversely proportional to the square of the frequency.) Based on this approximate knowledge of the relative noise ratio profile across the frequency bands, the perceived quality of speech is improved by weighting the lower frequencies more heavily so that greater suppression is achieved at these frequencies.

We take advantage of the knowledge of the typical noise power spectrum profile (or equivalently, the RNR profile) to obtain an adaptive weighting function. In general, the weight, $\hat{w}_f$ for a particular frequency, f, can be modeled as a function of frequency in many ways. One such model is $$\hat{w}_f = b(f-f_0)^2 + c \quad (16)$$

Figure 7:
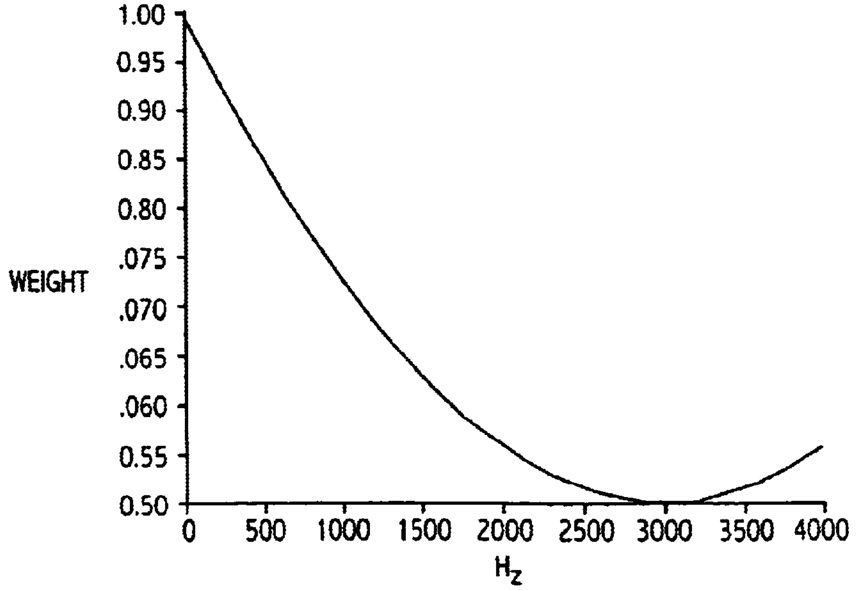
FIG. 7 is a curve plotting Hz versus weight obtained from a preferred form of adaptive weighting function in accordance with the invention.

This model has three parameters {b, $f_0$, c}. An example of a weighting curve obtained from this model is shown in FIG. 7 for $b=5.6\times10^{-8}$, $f_0=3000$ and c=0.5. The FIG. 7 curve varies monotonically with decreasing values of weight from 0 Hz to about 3000 Hz, and also varies monotonically with increasing values of weight from about 3000 Hz to about 4000 Hz. In practice, we could use the frequency band index, k, corresponding to the actual frequency f. This provides the following practical and efficient model with parameters {b, $k_0$, c}:

$$\hat{w}_k = b(k-k_0)^2 + c \quad (17)$$

In general, the ideal weights, $w_k$, may be obtained as a function of the measured noise power estimates, $P_N^k$, at each frequency band as follows:

$$w_k = \min\left(1, \frac{P_N^k}{\max_k\{P_N^k\}}\right) \quad (18)$$

Basically, the ideal weights are equal to the noise power measures normalized by the largest noise power measure. In general, the normalized power of a noise component in a particular frequency band is defined as a ratio of the power of the noise component in that frequency band and a function of some or all of the powers of the noise components in the frequency band or outside the frequency band. Equations (15) and (18) are examples of such normalized power of a noise component. In case all the power values are zero, the ideal weight is set to unity. This ideal weight is actually an alternative definition of RNR. We have discovered that noise cancellation can be improved by providing weighting which at least approximates normalized power of the noise signal component of the input communication signal. In the preferred embodiment, the normalized power may be calculated according to (18). Accordingly, function 100 (FIG. 3) may generate a preferred form of weighting signals having weighting values approximating equation (18).

The approximate model in (17) attempts to mimic the ideal weights computed using (18). To obtain the model parameters {b, $k_0$, c}, a least-squares approach may be used. An efficient way to perform this is to use the method of steepest descent to adapt the model parameters {b, $k_0$, c}.

We derive here the general method of adapting the model parameters using the steepest descent technique. First, the total squared error between the weights generated by the model and the ideal weights is defined for each frequency band as follows:

$$e^2 = \sum_{all\,k} |b(k-k_0)^2 + c - w_k|^2 \quad (19)$$

Taking the partial derivative of the total squared error, $e^2$, with respect to each of the model parameters in turn and dropping constant terms, we obtain $$\frac{\partial e^2}{\partial b} = \sum_{all\,k} [b(k-k_0)^2 + c - w_k](k-k_0)^2 \quad (20)$$

$$\frac{\partial e^2}{\partial k_0} = \sum_{all\,k} [b(k-k_0)^2 + c - w_k]b(k-k_0) \quad (21)$$

$$\frac{\partial e^2}{\partial c} = \sum_{all\,k} [b(k-k_0)^2 + c - w_k] \quad (22)$$

Denoting the model parameters and the error at the $n^{th}$ sample time as {$b_n$, $k_{0,n}$, $c_n$} and $e_n(k)$, respectively, the model parameters at the $(n+1)^{th}$ sample can be estimated as $$b_{n+1} = b_n - \lambda_b \frac{\partial e^2}{\partial b_n} \quad (23)$$

$$k_{0,n+1} = k_{0,n} - \lambda_k \frac{\partial e^2}{\partial k_{0,n}} \quad (24)$$

$$c_{n+1} = c_n - \lambda_c \frac{\partial e^2}{\partial c_n} \quad (25)$$

Here {$\lambda_b$, $\lambda_k$, $\lambda_c$} are appropriate step-size parameters. The model definition in (17) can then be used to obtain the weights for use in noise suppression, as well as being used for the next iteration of the algorithm. The iterations may be performed every sample time or slower, if desired, for economy.

We have described the alternative preferred RNR weight adaptation technique above. The weights obtained by this technique can be used to directly multiply the corresponding NSR values. These are then used to compute the gain factors for attenuation of the respective frequency bands.

In another embodiment, the weights are adapted efficiently using a simpler adaptation technique for economical reasons. We fix the value of the weighting model parameter $k_0$ to $k_0=36$ which corresponds to $f_0=2880$ Hz in (16). Furthermore, we set the model parameter $b_n$ at sample time n to be a function of $k_0$ and the remaining model parameter $c_n$ as follows:

$$b_n = \frac{1-c_n}{k_0^2} \tag{26}$$

Figure 8:
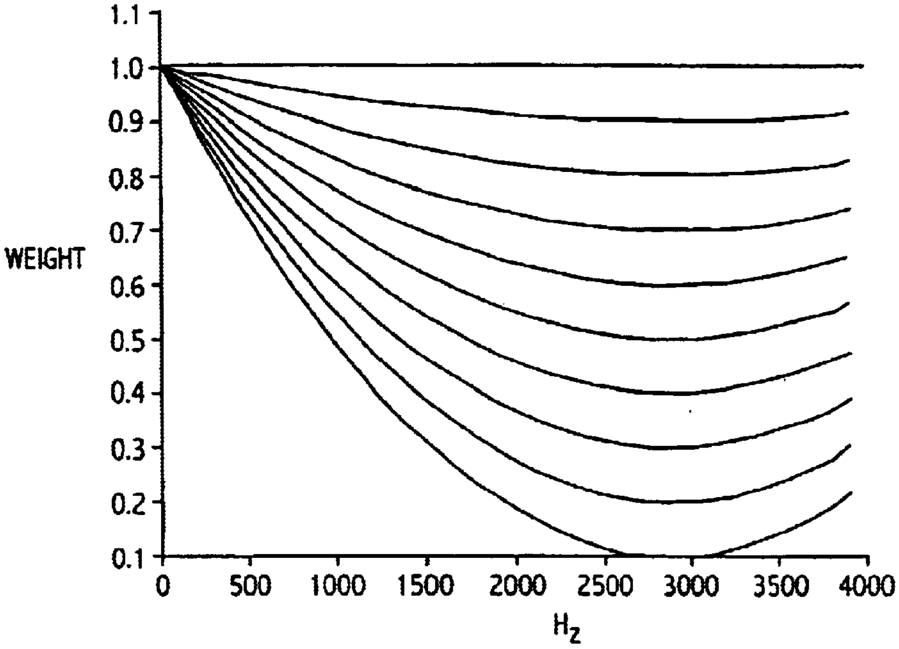
FIG. 8 is a graph plotting Hz versus weight for a family of weighting curves calculated according to a preferred embodiment of the invention.

Equation (26) is obtained by setting k=0 and $\hat{w}_k=1$ in (17). We adapt only $c_n$ to determine the curvature of the relative noise ratio weighting curve. The range of $c_n$ is restricted to [0.1,1.0]. Several weighting curves corresponding to these specifications are shown in FIG. 8. Lower values of $c_n$ correspond to the lower curves. When $c_n=1$, no spectral weighting is performed as shown in the uppermost line. For all other values of $c_n$, the curves vary monotonically in the same manner described in connection with FIG. 7. The greatest amount of curvature is obtained when $c_n=0.1$ as shown in the lowest curve. The applicants have found it advantageous to arrange the weighting values so that they vary monotonically between two frequencies separated by a factor of 2 (e.g., the weighting values vary monotonically between 1000–2000 Hz and/or between 1500–3000 Hz).

The determination of $c_n$ is performed by comparing the total noise power in the lower half of the signal bandwidth to the total noise power in the upper half. We define the total noise power in the lower and upper half bands as:

$$P_{total,lower}(n) = \sum_{k \in F_{lower}} P_N^k(n) \tag{27}$$

$$P_{total,upper}(n) = \sum_{k \in F_{upper}} P_N^k(n) \tag{28}$$

Alternatively, lowpass and highpass filter could be used to filter x(n) followed by appropriate power measurement using (6) to obtain these noise powers. In our filter bank implementation, $k\epsilon\{3,4, \ldots ,42\}$ and hence $F_{lower}=\{3, 4, \ldots 22\}$ and $F_{upper}=\{23,24, \ldots 42\}$. Although these power measures may be updated every sample, they are updated once every 2T samples for economical reasons. Hence the value of $c_n$ needs to be updated only as often as the power measures. It is defined as follows:

$$c_n = \max\left[\min\left[\frac{P_{total,upper}(n)}{P_{total,lower}(n)}, 1.0\right], 0.1\right] \tag{29}$$

The min and max functions restrict $c_n$ to lie within [0.1,1.0].

According to another embodiment, a curve, such as FIG. 7, could be stored as a weighting signal or table in memory 14 and used as static weighting values for each of the frequency band signals generated by filter 50. The curve could vary monotonically, as previously explained, or could vary according to the estimated spectral shape of noise or the estimated overall noise power, $P_{BN}(n)$,as explained in the next paragraphs.

Alternatively, the power spectral density shown in FIG. 6 could be thought of as defining the spectral shape of the noise component of the communication signal received on channel 20. The value of c is altered according to the spectral shape in order to determine the value of $w_k$ in equation (17). Spectral shape depends on the power of the noise component of the communication signal received on channel 20. As shown in equations (12) and (13), power is measured using time constants $\alpha_N^k$ and $\beta_N^k$ which vary according to the likelihood of speech as shown in Table 2. Thus, the weighting values determined according to the spectral shape of the noise component of the communication signal on channel 20 are derived in part from the likelihood that the communication signal is derived at least in part from speech.

According to another embodiment, the weighting values could be determined from the overall background noise power. In this embodiment, the value of c in equation (17) is determined by the value of $P_{BN}(n)$.

In general, according to the preceding paragraphs, the weighting values may vary in accordance with at least an approximation of one or more characteristics (e.g., spectral shape of noise or overall background power) of the noise signal component of the communication signal on channel 20.

Perceptual Spectral Weighting

We have discovered that improved noise cancellation results from perceptual spectral to weighting (PSW) in which different frequency bands are weighted differently based on their perceptual importance. Heavier weighting results in greater suppression in a frequency band. For a given SNR (or NSR), frequency bands where speech signals are more important to the perceptual quality are weighted less and hence suppressed less. Without such weighting, noisy speech may sometimes sound 'hollow' after noise reduction. Hollow sound has been a problem in previous noise reduction techniques because these systems had a tendency to oversuppress the perceptually important parts of speech. Such oversuppression was partly due to not taking into account the perceptually important spectral interdependence of the speech signal.

The perceptual importance of different frequency bands change depending on characteristics of the frequency distribution of the speech component of the communication signal being processed. Determining perceptual importance from such characteristics may be accomplished by a variety of methods. For example, the characteristics may be determined by the likelihood that a communication signal is derived from speech. As explained previously, this type of classification can be implemented by using a speech likelihood related signal, such as $h_{var}$. Assuming a signal was derived from speech, the type of signal can be further classified by determining whether the speech is voiced or unvoiced. Voiced speech results from vibration of vocal cords and is illustrated by utterance of a vowel sound. Unvoiced speech does not require vibration of vocal cords and is illustrated by utterance of a consonant sound.

Figure 9:
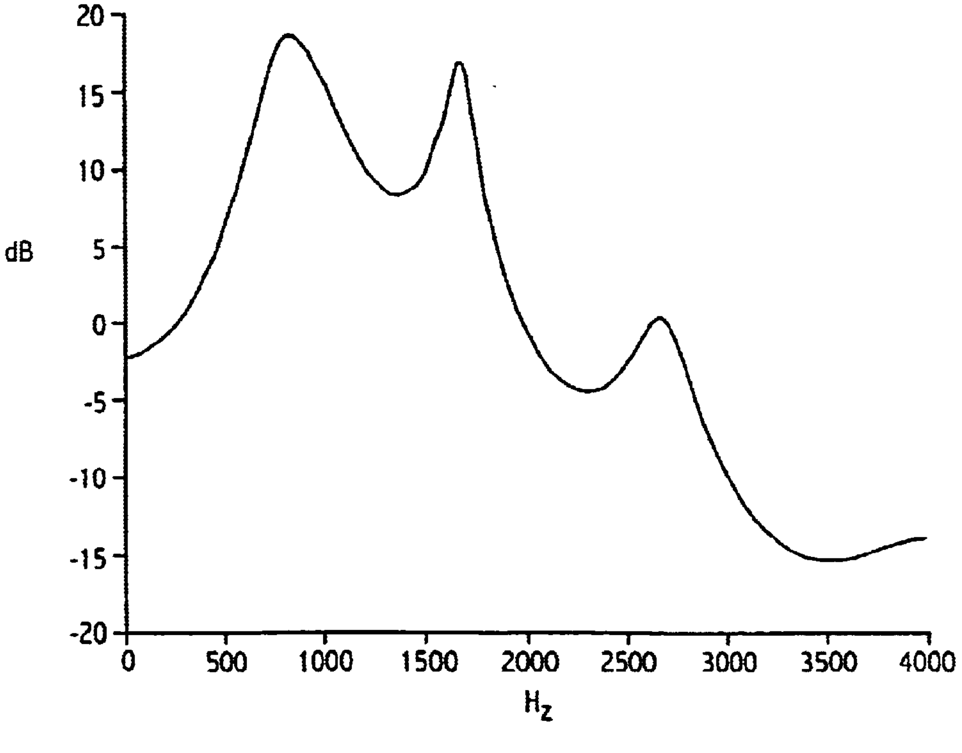
FIG. 9 is a graph plotting Hz versus decibels of the broad spectral shape of a typical voiced speech segment.
Figure 10:
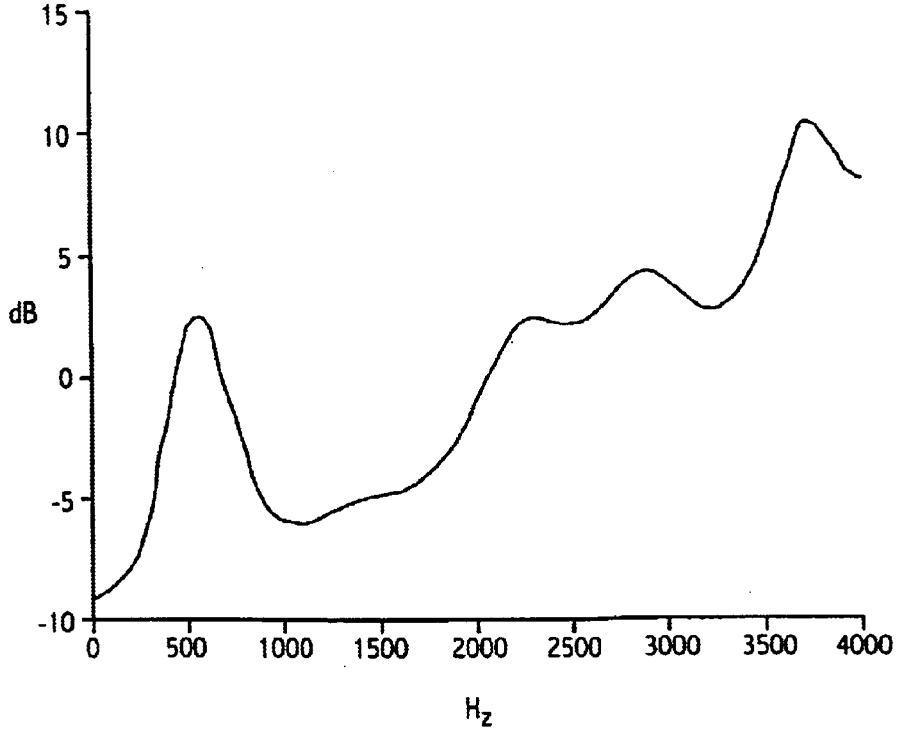
FIG. 10 is a graph plotting Hz versus decibels of the broad spectral shape of a typical unvoiced speech segment.

The broad spectral shapes of typical voiced and unvoiced speech segments are shown in FIGS. 9 and 10, respectively. Typically, the 1000 Hz to 3000 Hz regions contain most of the power in voiced speech. For unvoiced speech, the higher frequencies (>2500 Hz) tend to have greater overall power than the lower frequencies. The weighting in the PSW technique is adapted to maximize the perceived quality as the speech spectrum changes.

As in RNR weighting technique, the actual implementation of the perceptual spectral weighting may be performed directly on the gain factors for the individual frequency bands. Another alternative is to weight the power measures appropriately. In our preferred method, the weighting is incorporated into the NSR measures.

The PSW technique may be implemented independently or in any combination with the overall NSR based weighting and RNR based weighting methods. In our preferred implementation, we implement PSW together with the other two techniques as given in equation (2).

The weights in the PSW technique are selected to vary between zero and one. Larger weights correspond to greater suppression. The basic idea of PSW is to adapt the weighting curve in response to changes in the characteristics of the frequency distribution of at least some components of the communication signal on channel 20. For example, the weighting curve may be changed as the speech spectrum changes when the speech signal transitions from one type of communication signal to another, e.g., from voiced to unvoiced and vice versa. In some embodiments, the weighting curve may be adapted to changes in the speech component of the communication signal. The regions that are most critical to perceived quality (and which are usually over-suppressed when using previous methods) are weighted less so that they are suppressed less. However, if these perceptually important regions contain a significant amount of noise, then their weights will be adapted closer to one.

Many weighting models can be devised to achieve the PSW. In a manner similar to the RNR technique's weighting scheme given by equation (17), we utilize the practical and efficient model with parameters $\{b, k_0, c\}$:

$$v_k=b(k-k_0)^2+c \tag{30}$$

Here $v_k$ is the weight for frequency band k. In this method, we will vary only $k_0$ and c. This weighting curve is generally U-shaped and has a minimum value of c at frequency band $k_0$. For simplicity, we fix the weight at k=0 to unity. This gives the following equation for b as a function of $k_0$ and c:

$$b=\frac{1-c}{k_0^2} \tag{31}$$

The lowest weight frequency band, $k_0$, is adapted based on the likelihood of speech being voiced or unvoiced. In our preferred method, $k_0$ is allowed to be in the range [25,50], which corresponds to the frequency range [2000 Hz, 4000 Hz]. During strong voiced speech, it is desirable to have the U-shaped weighting curve $v_k$ to have the lowest weight frequency band $k_0$ to be near 2000 Hz. This ensures that the midband frequencies are weighted less in general. During unvoiced speech, the lowest weight frequency band $k_0$ is placed closer to 4000 Hz so that the mid to high frequencies are weighted less, since these frequencies contain most of the perceptually important parts of unvoiced speech. To achieve this, the lowest weight frequency band $k_0$ is varied with the speech likelihood related comparison signal which is the hangover counter, $h_{var}$, in our preferred method. Recall that $h_{var}$ is always in the range [0, $h_{max,3}$=2000]. Larger values of $h_{var}$ indicate higher likelihoods of speech and also indicate a higher likelihood of voiced speech. Thus, in our preferred method, the lowest weight frequency band is varied with the speech likelihood related comparison signal as follows:

$$k_0=\lfloor 50-h_{var}/80 \rfloor \tag{32}$$

Since $k_0$ is an integer, the floor function $\lfloor\cdot\rfloor$ is used for rounding.

Next, the method for adapting the minimum weight c is presented. In one approach, the minimum weight c could be fixed to a small value such as 0.25. However, this would always keep the weights in the neighborhood of the lowest weight frequency band $k_0$ at this minimum value even if there is a strong noise component in that neighborhood. This could possibly result in insufficient noise attenuation. Hence we use the novel concept of a regional NSR to adapt the minimum weight.

The regional NSR, $NSR_{regional}(k)$, is defined with respect to the minimum weight frequency band $k_0$ and is given by:

$$NSR_{regional}(n)=\frac{\sum_{k\in[k_0-2,k_0+2]} P_N^k(n)}{\sum_{k\in[k_0-2,k_0+2]} P_S^k(n)} \tag{33}$$

Basically, the regional NSR is the ratio of the noise power to the noisy signal power in a neighborhood of the minimum weight frequency band $k_0$. In our preferred method, we use up to 5 bands centered at $k_0$ as given in the above equation.

In our preferred implementation, when the regional NSR is −15 dB or lower, we set the minimum weight c to 0.25 (which is about 12 dB). As the regional NSR approaches its maximum value of 0 dB, the minimum weight is increased towards unity. This can be achieved by adapting the minimum weight c at sample time n as $$c=\begin{cases}0.25, & NSR_{overall}(n)<0.1778=-15\text{ dB}\\ 0.912NSR_{overall}(n)+0.088, & 0.1778\le NSR_{overall}(n)\le 1\end{cases} \tag{34}$$

Figure 11:
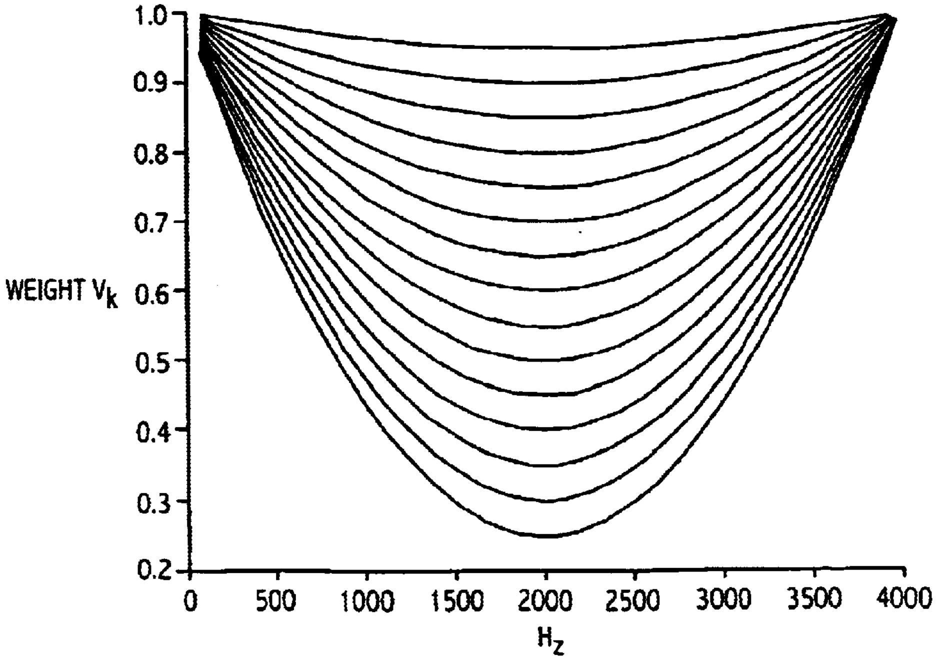
FIG. 11 is a graph plotting Hz versus decibels of perceptual spectral weighting curves for $k_O$=25.
Figure 12:
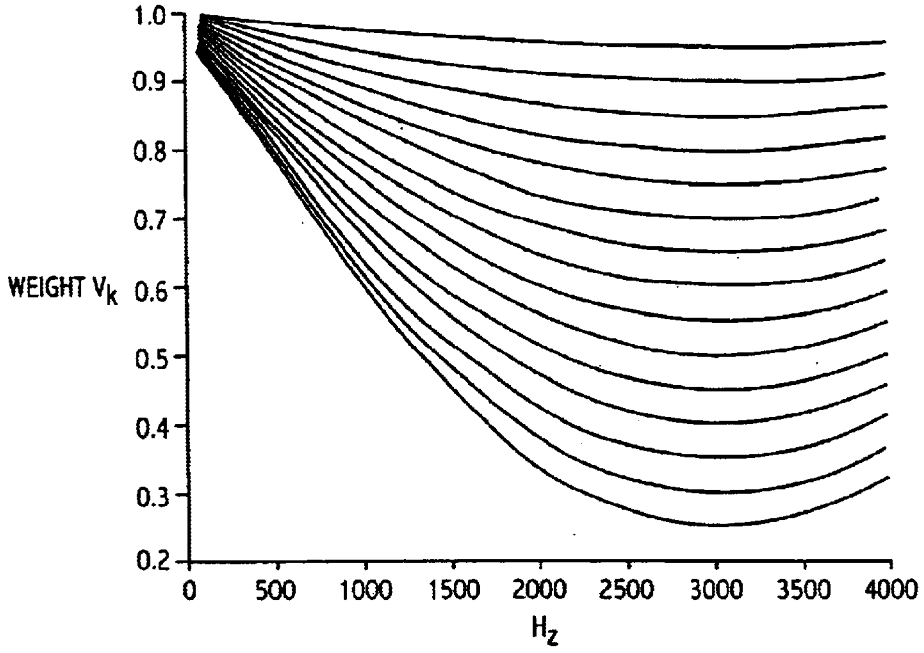
FIG. 12 is a graph plotting Hz versus decibels of perceptual spectral weighting curves for $k_O$=38.
Figure 13:
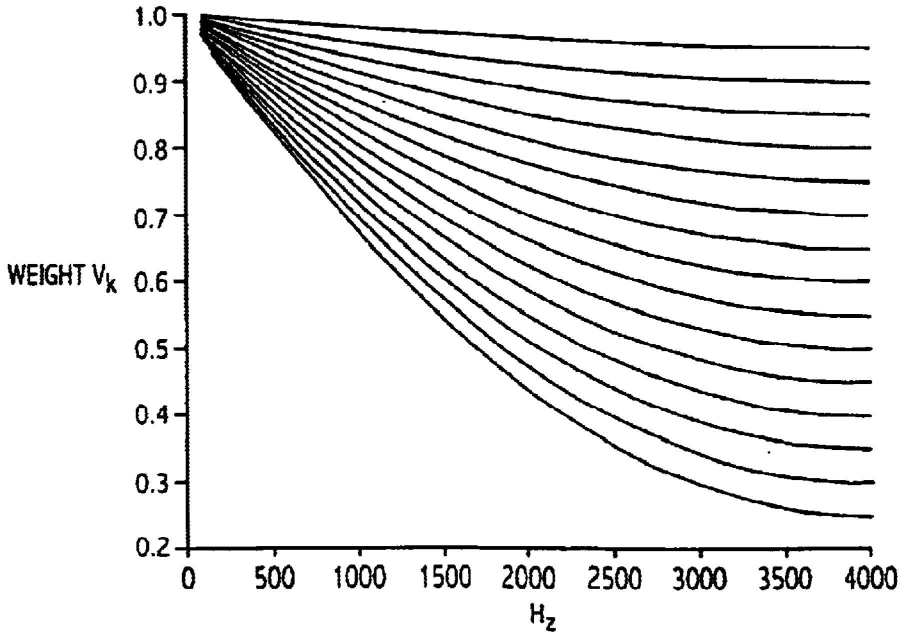
FIG. 13 is a graph plotting Hz versus decibels of perceptual spectral weighting curves for $k_O$=50.

The $v_k$ curves are plotted for a range of values of c and $k_0$ in FIGS. 11–13 to illustrate the flexibility that this technique provides in adapting the weighting curves. Regardless of $k_0$, the curves are flat when c=1, which corresponds to the situation where the regional NSR is unity (0 dB). The curves shown in FIGS. 11–13 have the same monotonic properties and may be stored in memory 14 as a weighting signal or table in the same manner previously described in connection with FIG. 7.

As can be seen from equation (32), processor 12 generates a control signal from the speech likelihood signal $h_{var}$ which represents a characteristic of the speech and noise components of the communication signal on channel 20. As previously explained, the likelihood signal can also be used as a measure of whether the speech is voiced or unvoiced. Determining whether the speech is voiced or unvoiced can be accomplished by means other than the likelihood signal. Such means are known to those skilled in the field of communications.

The characteristics of the frequency distribution of the speech component of the channel 20 signal needed for PSW also can be determined from the output of pitch estimator 74. In this embodiment, the pitch estimate is used as a control signal which indicates the characteristics of the frequency distribution of the speech component of the channel 20 signal needed for PSW. The pitch estimate, or to be more specific, the rate of change of the pitch, can be used to solve for $k_0$ in equation (32). A slow rate of change would correspond to smaller $k_0$ values, and vice versa.

Figure 1A:
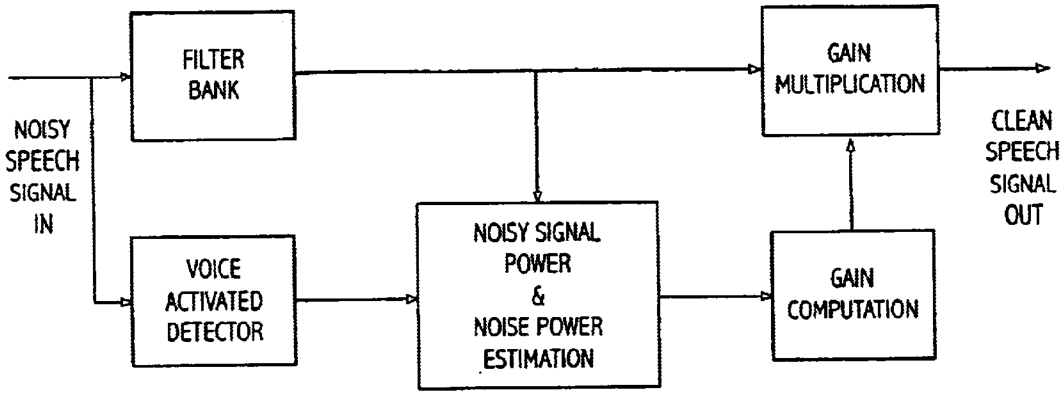
FIG. 1A PRIOR ART
FIGS. 1A and 1B are schematic block diagrams of known noise cancellation systems.
Figure 1B:
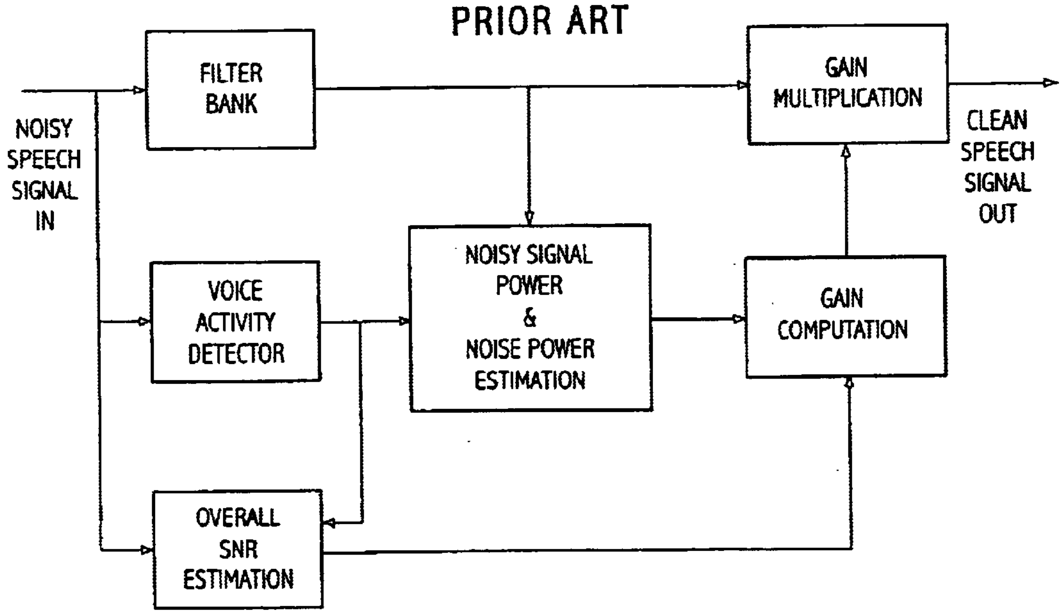
FIG. 1B PRIOR ART
Figure 2:
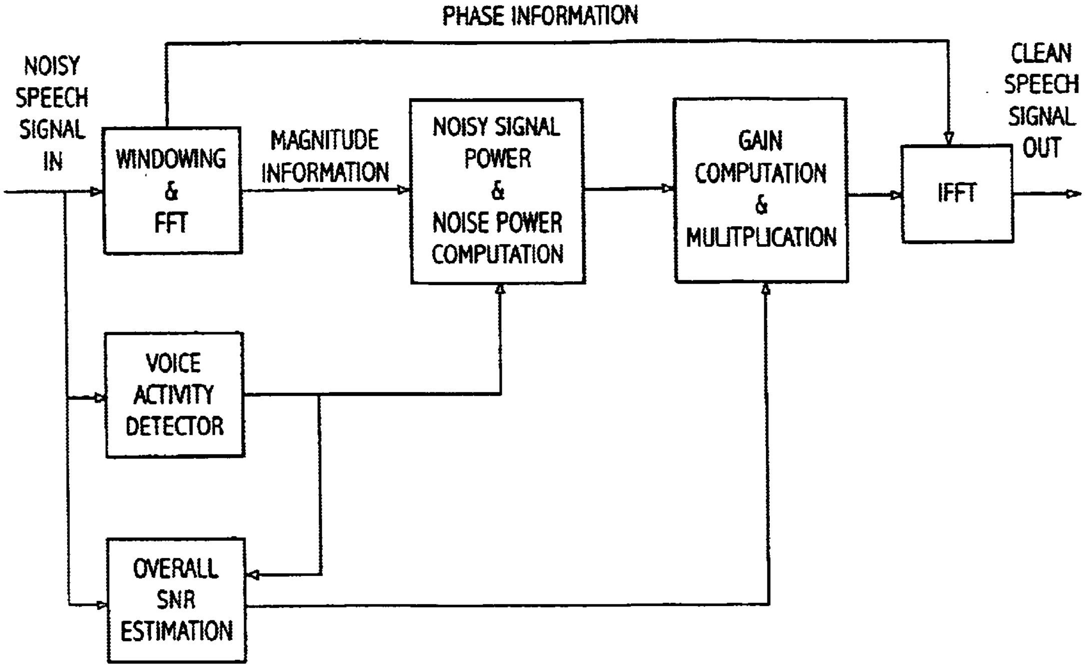
FIG. 2 PRIOR ART
FIG. 2 is a schematic block diagram of another form of a known noise cancellation system.

In one embodiment of PSW, the calculated weights for the different bands are based on an approximation of the broad spectral shape or envelope of the speech component of the communication signal on channel 20. More specifically, the calculated weighting curve has a generally inverse relationship to the broad spectral shape of the speech component of the channel 20 signal. An example of such an inverse relationship is to calculate the weighting curve to be inversely proportional to the speech spectrum, such that when the broad spectral shape of the speech spectrum is multiplied by the weighting curve, the resulting broad spectral shape is approximately flat or constant at all frequencies in the frequency bands of interest. This is different from the standard spectral subtraction weighting which is based on the noise-to-signal ratio of individual bands. In this embodiment of PSW, we are taking into consideration the entire speech signal (or a significant portion of it) to determine the weighting curve for all the frequency bands. In spectral subtraction, the weights are determined based only on the individual bands. Even in a spectral subtraction implementation such as in FIG. 1B, only the overall SNR or NSR is considered but not the broad spectral shape.

Computation of Broad Spectral Shape or Envelope of Speech

There are many methods available to approximate the broad spectral shape of the speech component of the channel 20 signal. For instance, linear prediction analysis techniques, commonly used in speech coding, can be used to determine the spectral shape.

Alternatively, if the noise and signal powers of individual frequency bands are tracked using equations such as (12) and (13), the speech spectrum power at the $k^{th}$ band can be estimated as $[P_S^k(n)-P_N^k(n)]$. Since the goal is to obtain the broad spectral shape, the total power, $P_S^k(n)$, may be used to approximate the speech power in the band. This is reasonable since, when speech is present, the signal spectrum shape is usually dominated by the speech spectrum shape. The set of band power values together provide the broad spectral shape estimate or envelope estimate. The number of band power values in the set will vary depending on the desired accuracy of the estimate. Smoothing of these band power values using moving average techniques is also beneficial to remove jaggedness in the envelope estimate.

Computation of Perceptual Spectral Weighting Curve

After the broad spectral shape is approximated, the perceptual weighting curve may be determined to be inversely proportional to the broad spectral shape approximation. For instance, if $P_S^k(n)$ is used as the broad spectral shape estimate at the $k^{th}$ band, then the weight for the $k^{th}$ band, $v_k$, may be determined as $v_k(n)=\psi|P_S^k(n)$, where $\psi$ is a predetermined value. In this embodiment, a set of speech power values, such as a set of $P_S^k(n)$ values, is used as a control signal indicating the characteristics of the frequency distribution of the speech component of the channel 20 signal needed for PSW. By using the foregoing spectral shape estimate and weighting curve, the variation of the power signals used for the estimate is reduced across the N frequency bands. For instance, the spectrum shape of the speech component of the channel 20 signal is made more nearly flat across the N frequency bands, and the variation in the spectrum shape is reduced.

For economical reasons, we use a parametric technique in our preferred implementation which also has the advantage that the weighting curve is always smooth across frequencies. We use a parametric weighting curve, i.e. the weighting curve is formed based on a few parameters that are adapted based on the spectral shape. The number of parameters is less than the number of weighting factors. The parametric weighting function in our economical implementation is given by the equation (30), which is a quadratic curve with three parameters.

Use of Weighting Functions

Although we have implemented weighting functions based on overall NSR ($u_k$), perceptual spectral weighting ($v_k$) and relative noise ratio weighting ($w_k$) jointly, a noise cancellation system will benefit from the implementation of only one or various combinations of the functions.

In our preferred embodiment, we implement the weighting on the NSR values for the different frequency bands. One could implement these weighting functions just as well, after appropriate modifications, directly on the gain factors. Alternatively, one could apply the weights directly to the power measures prior to computation of the noise-to-signal values or the gain factors. A further possibility is to perform the different weighting functions on different variables appropriately in the ANC system. Thus, the novel weighting techniques described are not restricted to specific implementations.

Spectral Smoothing and Gain Variance Reduction Across Frequency Bands

In some noise cancellation applications, the bandpass filters of the filter bank used to separate the speech signal into different frequency band components have little overlap. Specifically, the magnitude frequency response of one filter does not significantly overlap the magnitude frequency response of any other filter in the filter bank. This is also usually true for discrete Fourier or fast Fourier transform based implementations. In such cases, we have discovered that improved noise cancellation can be achieved by interdependent gain adjustment. Such adjustment is affected by smoothing of the input signal spectrum and reduction in variance of gain factors across the frequency bands according to the techniques described below. The splitting of the speech signal into different frequency bands and applying independently determined gain factors on each band can sometimes destroy the natural spectral shape of the speech signal. Smoothing the gain factors across the bands can help to preserve the natural spectral shape of the speech signal. Furthermore, it also reduces the variance of the gain factors.

This smoothing of the gain factors, $G_k(n)$ (equation (1)), can be performed by modifying each of the initial gain factors as a function of at least two of the initial gain factors. The initial gain factors preferably are generated in the form of signals with initial gain values in function block 130 (FIG. 3) according to equation (1). According to the preferred embodiment, the initial gain factors or values are modified using a weighted moving average. The gain factors corresponding to the low and high values of k must be handled slightly differently to prevent edge effects. The initial gain factors are modified by recalculating equation (1) in function 130 to a preferred form of modified gain signals having modified gain values or factors. Then the modified gain factors are used for gain multiplication by equation (3) in function block 140 (FIG. 3).

More specifically, we compute the modified gains by first computing a set of initial gain values, $G'_k(n)$. We then perform a moving average weighting of these initial gain factors with neighboring gain values to obtain a new set of gain values, $G_k(n)$. The modified gain values derived from the initial gain values is given by $$G_k(n) = \sum_{k=k_1}^{k_2} M_k G'_k(n) \tag{35}$$

The $M_k$ are the moving average coefficients tabulated below for our preferred embodiment.

| Range of k | Moving Average Weighting Coefficients, $M_k$ | First coefficient to be multiplied with |
|---|---|---|
| k = 3 | 0.95, 0.04, 0.01 | $G'_3(n)$ |
| k = 4 | 0.02, 0.95, 0.02,0.01 | $G'_3(n)$ |
| $5 \leq k \leq 40$ | 0.005, 0.02, 0.95, 0.02, 0.005 | $G'_{k-2}(n)$ |
| k = 41 | 0.01, 0.02, 0.95, 0.02 | $G'_{39}(n)$ |
| k = 42 | 0.01, 0.04, 0.95 | $G'_{40}(n)$ |

We have discovered that improved noise cancellation is possible with coefficients selected from the following ranges of values. One of the coefficients is in the range of 10 to 50 times the value of the sum of the other coefficients. For example, the coefficient 0.95 is in the range of 10 to 50 times the value of the sum of the other coefficients shown in each line of the preceding table. More specifically, the coefficient 0.95 is in the range from 0.90 to 0.98. The coefficient 0.05 is in the range 0.02 to 0.09.

In another embodiment, we compute the gain factor for a particular frequency band as a function not only of the corresponding noisy signal and noise powers, but also as a function of the neighboring noisy signal and noise powers. Recall equation (1):

$$G_k(n) = \begin{cases} 1 - W_k(n)NSR_k(n), & n = 0, T, 2T, \ldots \\ G_k(n-1), & n = 1, 2, \ldots, T-1, \; T+1, \ldots, 2T-1, \ldots \end{cases} \quad (1)$$

In this equation, the gain for frequency band k depends on $NSR_k(n)$ which in turn depends on the noise power, $P_N^k(n)$, and noisy signal power, $P_S^k(n)$ of the same frequency band. We have discovered an improvement on this concept whereby $G_k(n)$ is computed as a function noise power and noisy signal power values from multiple frequency bands. According to this improvement, $G_k(n)$ may be computed using one of the following methods:

$$G_k(n) = \begin{cases} 1 - W_k(n)\sum_{k=k_1}^{k_2} M_k NSR_k(n), & n = 0, T, 2T, \ldots \\ G_k(n-1), & n = 1, 2, \ldots, T-1, \; T+1, \ldots, 2T-1, \ldots \end{cases} \quad (1.1)$$

$$G_k(n) = \begin{cases} 1 - W_k(n)\frac{\sum_{k=k_1}^{k_2} M_k P_N^k(n)}{P_S^k(n)}, & n = 0, T, 2T, \ldots \\ G_k(n-1), & n = 1, 2, \ldots, T-1, \; T+1, \ldots, 2T-1, \ldots \end{cases} \quad (1.2)$$

$$G_k(n) = \begin{cases} 1 - W_k(n)\frac{P_N^k(n)}{\sum_{k=k_1}^{k_2} M_k P_S^k(n)}, & n = 0, T, 2T, \ldots \\ G_k(n-1), & n = 1, 2, \ldots, T-1, \; T+1, \ldots, 2T-1, \ldots \end{cases} \quad (1.3)$$

$$G_k(n) = \begin{cases} 1 - W_k(n)\frac{\sum_{k=k_1}^{k_2} M_k P_N^k(n)}{\sum_{k=k_1}^{k_2} M_k P_S^k(n)}, & n = 0, T, 2T, \ldots \\ G_k(n-1), & n = 1, 2, \ldots, T-1, \; T+1, \ldots, 2T-1, \ldots \end{cases} \quad (1.4)$$

Our preferred embodiment uses equation (1.4) with $M_k$ determined using the same table given above.

Methods described by equations (1.1)–(1.4) all provide smoothing of the input signal spectrum and reduction in variance of the gain factors across the frequency bands. Each method has its own particular advantages and trade-offs. The first method (1.1) is simply an alternative to smoothing the gains directly.

The method of (1.2) provides smoothing across the noise spectrum only while (1.3) provides smoothing across the noisy signal spectrum only. Each method has its advantages where the average spectral shape of the corresponding signals are maintained. By performing the averaging in (1.2), sudden bursts of noise happening in a particular band for very short periods would not adversely affect the estimate of the noise spectrum. Similarly in method (1.3), the broad spectral shape of the speech spectrum which is generally smooth in nature will not become too jagged in the noisy signal power estimates due to, for instance, changing pitch of the speaker. The method of (1.4) combines the advantages of both (1.2) and (1.3).

There is a subtle difference between (1.4) and (1.1). In (1.4), the averaging is performed prior to determining the NSR ratio. In (1.1), the NSR values are computed first and then averaged. Method (1.4) is computationally more expensive than (1.1) but performs better than (1.1).

References

[1] IEEE Transactions on Acoustics, Speech and Signal Processing, vol. 28, No. 2, April 1980, pp. 137–145, "Speech Enhancement Using a Soft-Decision Noise Suppression Filter", Robert J. McAulay and Marilyn L. Malpass.

[2] IEEE Conference on Acoustics, Speech and Signal Processing, April 1979, pp. 208–211, "Enhancement of Speech Corrupted by Acoustic Noise", M. Berouti, R. Schwartz and J. Makhoul.

[3] Advanced Signal Processing and Digital Noise Reduction, 1996, Chapter 9, pp. 242–260, Saeed V. Vaseghi. (ISBN Wiley 0471958751)

[4] Proceedings of the IEEE, Vol. 67, No. 12, December 1979, pp. 1586–1604, "Enhancement and Bandwidth Compression of Noisy Speech", Jake S. Lim and Alan V. Oppenheim.

[5] U.S. Pat. No. 4,351,983, "Speech detector with variable threshold", Sep. 28, 1982. William G. Crouse, Charles R. Knox.

Those skilled in the art will recognize that preceding detailed description discloses the preferred embodiments and that those embodiments may be altered and modified without departing from the true spirit and scope of the invention as defined by the accompanying claims. For example, the numerators and denominators of the ratios shown in this specification could be reversed and the shape of the curves shown in FIGS. 5, 7 and 8 could be reversed by making other suitable changes in the algorithms. In addition, the function blocks shown in FIG. 3 could be implemented in whole or in part by application specific integrated circuits or other forms of logic circuits capable of performing logical and arithmetic operations.

What is claimed is:

1. In a communication system for processing a communication signal comprising speech signal components due to speech and noise signal components due to noise, apparatus for enhancing the quality of the communication signal comprising:

a filter arranged to divide the communication signal into a plurality of frequency band signals representing the speech signal components and the noise signal components in a plurality of frequency bands; and a calculator generating a plurality of weighting signals having weighting values corresponding to the frequency band signals, the weighting values derived from at least approximations of the normalized powers of the noise signal components in the frequency band signals, the weighting values varying monotonically with a first variation of the values of weight from a first value of weight at a first frequency to a second value of weight at a second frequency greater than the first frequency and the weighting values varying monotonically with a second variation of the values of weight opposite the first variation of the values of weight from the second value of weight to a third value of weight between the first value of weight and second value of weight at a frequency greater than the second frequency, combining the frequency band signals with the weighting signals to generate weighted frequency band signals, and combining the weighted frequency band signals to generate a communication signal with enhanced quality.

2. Apparatus, as claimed in claim 1, wherein the weighting values vary in accordance with at least an approximation of one or more characteristics of the noise signal component of the communication signal.

3. Apparatus, as claimed in claim 1, wherein the weighting values vary according to the spectral shape of the noise component of the communication signal.

4. Apparatus, as claimed in claim 1, wherein the weighting values are derived in part from the likelihood that the communication signal is derived at least in part from speech.

5. Apparatus, as claimed in claim 1, wherein the weighting signals vary according to a ratio of overall noisy signal power and overall background noise power of the communication signal.

6. Apparatus, as claimed in claim 1, wherein the approximations of the normalized powers of the noise signal components are derived from at least approximations of ratios of a power of one of the noise signal components in one of the frequency band signals and a maximum noise power value representing the maximum power of the noise signal components in one of a plurality of the frequency band signals.

7. Apparatus, as claimed in claim 1, wherein the filter forms a portion of the calculator.

8. Apparatus, as claimed in claim 1, wherein the calculator comprises a digital signal processor.

9. Apparatus, as claimed in claim 1, wherein the first variation of the values of weight comprises a decreasing variation and wherein the second variation of the values of weight comprises an increasing variation.

10. In a communication system for processing a communication signal comprising speech signal components due to speech and noise signal components due to noise, a method of enhancing the quality of the communication signal comprising:

dividing the communication signal into a plurality of frequency band signals representing the speech signal components and the noise signal components;

generating a plurality of weighting signals having weighting values corresponding to the frequency band signals, the weighting values derived from at least approximations of the normalized powers of the noise signal components in the frequency band signals, varying the weighting values monotonically with a first variation of the values of weight from a first value of weight at a first frequency to a second value of weight at a second frequency greater than the first frequency and varying the weighting values monotonically with a second variation of the values of weight opposite the first variation of the values of weight from the second value of weight to a third value of weight between the first value of weight and second value of weight at a frequency greater than the second frequency;

combining the frequency band signals with the weighting signals to generate weighted frequency band signals; and combining the weighted frequency band signals to generate a communication signal with enhanced quality.

11. A method, as claimed in claim 10, wherein the weighting values vary in accordance with at least an approximation of one or more characteristics of the noise signal component of the communication signal.

12. A method, as claimed in claim 10, wherein the weighting values vary according to the spectral shape of the noise component of the communication signal.

13. A method, as claimed in claim 10, wherein the weighting values are derived in part from the likelihood that the communication signal is derived at least in part from speech.

14. A method, as claimed in claim 10, wherein the weighting signals vary according to a ratio of overall noisy signal power and overall background noise power of the communication signal.

15. A method, as claimed in claim 10, wherein the approximations of the normalized powers of the noise signal components are derived from at least approximations of ratios of a power of one of the noise signal components in one of the frequency band signals and a maximum noise power value representing the maximum power of the noise signal components in one of a plurality of the frequency band signals.

16. A method, as claimed in claim 10, wherein the first variation of the values of weight comprises a decreasing variation and wherein the second variation of the values of weight comprises an increasing variation.

17. In a communication system for processing a communication signal comprising a speech signal component due to speech and a noise signal component due to noise, apparatus for enhancing the quality of the communication signal comprising:

means for dividing the communication signal into a plurality of frequency band signals representing a plurality of frequency bands;

a memory storing at least one weighting signal having weighting values varying in accordance with at least an approximation of one or more characteristics of the noise signal component of the communication signal, the weighting values varying monotonically with a first variation of the values of weight from a first value of weight at a first frequency to a second value of weight different from the first value of weight at a second frequency greater than the first frequency and the weighting values varying monotonically with a second variation of the values of weight opposite the first variation of the values of weight from the second value of weight to a third value of weight between the first value of weight and second value of weight at a frequency greater than the second frequency; and a calculator combining the frequency band signals with the at least one weighting signal to generate weighted frequency band signals, and combining the weighted frequency band signals to generate a communication signal with enhanced quality.

18. Apparatus, as claimed in claim 17, wherein the weighting values vary according to the spectral shape of the noise component of the communication signal.

19. Apparatus, as claimed in claim 17, wherein the weighting values are derived in part from the likelihood that the communication signal is derived at least in part from speech.

20. Apparatus, as claimed in claim 17, wherein the weighting values vary according to a ratio of overall noisy signal power and overall background noise power of the communication signal.

21. Apparatus, as claimed in claim 17, wherein the first variation of the values of weight comprises a decreasing variation and wherein the second variation of the values of weight comprises an increasing variation.

22. In a communication system for processing a communication signal comprising a speech signal component due to speech and a noise signal component due to noise, a method of enhancing the quality of the communication signal comprising:

dividing said communication signal into a plurality of frequency band signals representing a plurality of frequency bands;

storing at least one weighting signal having weighting values varying in accordance with at least an approximation of one or more characteristics of the noise signal component of the communication signal, varying the weighting values monotonically with a first variation of the values of weight from a first value of weight at a first frequency to a second value of weight different from the first value of weight at a second frequency greater than the first frequency and varying the weighting values monotonically with a second variation of the values of weight opposite the first variation of the values of weight from the second value of weight to a third value of weight between the first value of weight and second value of weight at a frequency greater than the second frequency;

combining the frequency band signals with the at least one weighting signal to generate weighted frequency band signals; and combining the weighted frequency band signals to generate a communication signal with enhanced quality.

23. A method, as claimed in claim 22, wherein the weighting values vary according to the spectral shape of the noise component of the communication signal.

24. A method, as claimed in claim 22, wherein the weighting values are derived at least in part from the likelihood that the communication signal is derived at least in part from speech.

25. A method, as claimed in claim 22, wherein the weighting values vary according to a ratio of overall noisy signal power and overall background noise power of the communication signal.

26. A method, as claimed in claim 22, wherein the first variation of the values of weight comprises a decreasing variation and wherein the second variation of the values of weight comprises an increasing variation.

27. In a communication system for processing a communication signal comprising speech signal components due to speech and noise signal components due to noise, apparatus for enhancing the quality of the communication signal comprising:

means for dividing the communication signal into a plurality of frequency band signals representing the speech signal components and the noise signal components in a plurality of frequency bands, the frequency band signals defining a first group signal representing a first group of the frequency band signals and a second group signal representing a second group of the frequency band signals; and a calculator generating a first group noise power signal having a first group noise power value related to the power of the noise signal component in the first group signal, generating a second group noise power signal having a second group noise power value related to the power of the noise signal component in the second group signal, generating a plurality of weighting signals having weighting values corresponding to the frequency band signals, at least one of the weighting signals having a weighting value derived from a ratio of the first group noise power value and the second group noise power value, altering the frequency band signals in response to the weighting signals to generate weighted frequency band signals, and combining the weighted frequency band signals to generate a communication signal with enhanced quality.

28. Apparatus, as claimed in claim 27, wherein the ratio is scaled by a first scaling factor.

29. Apparatus, as claimed in claim 27, wherein the second group of frequency band signals represents higher frequencies than the first group of frequency band signals.

30. Apparatus, as claimed in claim 27, wherein the first group of frequency band signals comprises a plurality of frequency band signals, wherein the second group of frequency band signals comprises a plurality of frequency band signals and wherein the calculator generates the first group noise power signal by summing the values of signals representing the power of the noise signal component in each of the frequency band signals in the first group and generates the second group noise power signal by summing the values of signals representing the power of the noise signal component in each of the frequency bands in the second group.

31. In a communication system for processing a communication signal comprising speech signal components due to speech and noise signal components due to noise, apparatus for enhancing the quality of the communication signal comprising:

means for dividing the communication signal into a plurality of frequency band signals representing the speech signal components and the noise signal components in a plurality of frequency bands, the frequency band signals comprising a selected number of frequency band signals including at least a first frequency band signal and a second frequency band signal; and a calculator generating an overall noise power signal having an overall noise power value related to the power of the noise components in at least some of the selected number of frequency band signals, generating a first band power signal having a first band power value related to the power of the noise components in the first frequency band signal and a second band power signal having a second band power value related to the power of the noise components in the second frequency band signal, generating a plurality of weighting signals having weighting values corresponding to the frequency band signals, a first of the weighting signals having a first weighting value derived from a ratio of the first band power value and a scaled value derived from the overall noise power value, and a second of the weighting signals having a second weighting value derived from a ratio of the second band power value and the scaled value, altering the first frequency band signal in response to the first weighting value to generate a first weighted frequency band signal, altering the second frequency band signal in response to the second weighting value to generate a second weighted frequency band signal, and combining the weighted frequency band signals to generate a communication signal with enhanced quality.

32. Apparatus, as claimed in claim 31, wherein the scaled value is derived from an average of the power of the noise components in the selected number of frequency bands.

33. Apparatus, as claimed in claim 31, wherein the calculator detects voice activity and generates a first signal indicating that the communication signal is derived at least in part from speech, and wherein the calculator is responsive to the first signal.

34. Apparatus, as claimed in claim 31, wherein the calculator further calculates an overall noisy signal power signal having a noisy signal power value related to the overall noisy signal power in the communication signal, wherein the calculator generates a noise signal ratio signal having a noise signal ratio value derived from a ratio of the overall noise power value and the overall noisy signal power value, and wherein the first weighting value and the second weighting value are derived in part from the noise signal ratio value.

35. Apparatus, as claimed in claim 31, wherein the means for dividing comprises a portion of the calculator.

36. Apparatus, as claimed in claim 31, wherein the calculator comprises a digital signal processor.

37. In a communication system for processing a communication signal comprising speech signal components due to speech and noise signal components due to noise, a method of enhancing the quality of the communication signal comprising:

dividing the communication signal into a plurality of frequency band signals representing the speech signal components and the noise signal components and defining a first group signal representing a first group of the frequency band signals and a second group signal representing a second group of the frequency band signals;

generating a first group noise power signal having a first group noise power value related to the power of the noise signal component in the first group signal;

generating a second group noise power signal having a second group noise power value related to the power of the noise signal component in the second group signal;

generating a plurality of weighting signals having weighting values corresponding to the frequency band signals, at least one of the weighting signals having a weighting value derived from a ratio of the first group noise power value and the second group noise power value;

altering the frequency band signals in response to the weighting signals to generate weighted frequency band signals; and combining the weighted frequency band signals to generate a communication signal with enhanced quality.

38. A method, as claimed in claim 37, wherein the ratio is scaled by a first scaling factor.

39. A method, as claimed in claim 37, wherein the second group of frequency band signals represents higher frequencies than the first group of frequency band signals.

40. A method, as claimed in claim 37, wherein the first group of frequency band signals comprises a plurality of frequency band signals, wherein the second group of frequency band signals comprises a plurality of frequency band signals and wherein the generating the first group noise power signal comprises summing the values of signals representing the power of the noise signal component in each of the frequency band signals in the first group and wherein the generating the second group noise power signal comprises summing the values of signals representing the power of the noise signal component in each of the frequency bands in the second group.

41. In a communication system for processing a communication signal comprising speech signal components due to speech and noise signal components due to noise, a method of enhancing the quality of the communication signal comprising:

dividing the communication signal into a plurality of frequency band signals representing the speech signal components and the noise signal components, the frequency band signals comprising a selected number of frequency band signals including at least a first frequency band signal and a second frequency band signal;

generating an overall noise power signal having an overall noise power value related to the power of the noise signal components in at least some of the selected number of frequency band signals;

generating a first band power signal having a first band power value related to the power of the noise components in the first frequency band signal;

generating a second band power signal having a second band power value related to the power of the noise components in the second frequency band signal;

generating a plurality of weighting signals having weighting values corresponding to the frequency band signals, a first of the weighting signals having a first weighting value derived from a ratio of the first band power value and a scaled value derived from the overall noise power value, and a second of the weighting signals having a second weighting value derived from a ratio of the second band power value and the scaled value;

altering the first frequency band signal in response to the first weighting value to generate a first weighted frequency band signal;

altering the second frequency band signal in response to the second weighting value to generate a second weighted frequency band signal; and combining the weighted frequency band signals to generate a communication signal with enhanced quality.

42. A method, as claimed in claim 41, wherein the scaled value is derived from an average of the power of the noise components.

43. A method, as claimed in claim 41, and further comprising:

generating a first signal indicating that the communication signal is derived at least in part from speech, and wherein the generating an overall noise power signal, generating a first band power signal and generating a second band power signal are responsive to the first signal.

44. A method, as claimed in claim 41, and further comprising:

calculating an overall noisy signal power signal having a noisy signal power value related to the overall noisy signal power in the communication signal; and generating a noise signal ratio signal having a noise signal ratio value derived from a ratio of the overall noise power value and the overall noisy signal power value; and wherein the first weighting value and the second weighting value are derived in part from the noise signal ratio value.

* * * * *